(12) United States Patent
Candelore

(10) Patent No.: US 11,800,178 B2
(45) Date of Patent: Oct. 24, 2023

(54) SIMPLIFIED USER INTERFACE FOR MEDIA RENDERING DEVICE

(71) Applicant: SONY GROUP CORPORATION, Tokyo (JP)

(72) Inventor: Brant Candelore, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 103 days.

(21) Appl. No.: 17/464,803

(22) Filed: Sep. 2, 2021

(65) Prior Publication Data
US 2023/0073037 A1 Mar. 9, 2023

(51) Int. Cl.
| H04N 21/431 | (2011.01) |
| H04N 21/422 | (2011.01) |
| H04N 21/45 | (2011.01) |
| H04N 21/475 | (2011.01) |
| H04N 21/488 | (2011.01) |

(52) U.S. Cl.
CPC ... *H04N 21/4312* (2013.01); *H04N 21/42204* (2013.01); *H04N 21/4532* (2013.01); *H04N 21/4753* (2013.01); *H04N 21/4882* (2013.01)

(58) Field of Classification Search
CPC ......... H04N 21/4312; H04N 21/42204; H04N 21/4532; H04N 21/4753; H04N 21/4882
USPC .......................................................... 725/30
See application file for complete search history.

(56) References Cited

U.S. PATENT DOCUMENTS

| 8,813,108 | B2 * | 8/2014 | Bi ..................... | G06Q 30/0269 |
| | | | | 725/13 |
| 9,591,250 | B2 | 3/2017 | Walker | |
| 9,959,782 | B1 | 5/2018 | Candelore et al. | |
| 10,264,206 | B1 | 4/2019 | Candelore et al. | |
| 2009/0271826 | A1 * | 10/2009 | Lee .................... | H04N 21/4826 |
| | | | | 725/46 |
| 2013/0305294 | A1 * | 11/2013 | Jenzowsky ......... | H04N 21/482 |
| | | | | 725/61 |
| 2015/0074728 | A1 * | 3/2015 | Chai ................... | H04N 21/482 |
| | | | | 725/61 |
| 2015/0281754 | A1 * | 10/2015 | Deen .................. | H04N 21/6334 |
| | | | | 725/37 |

(Continued)

FOREIGN PATENT DOCUMENTS

| CN | 105307015 A | 2/2016 |
| CN | 105578306 A | 5/2016 |

(Continued)

*Primary Examiner* — Nathan J Flynn
*Assistant Examiner* — Caroline Somera
(74) *Attorney, Agent, or Firm* — CHIP LAW GROUP

(57) ABSTRACT

A media rendering device and method for generation of a simplified user interface are provided. The media rendering device determines a user profile of a user of the media rendering device. The media rendering device includes a plurality of user interface modes including a specific user interface mode associated with a plurality of user interface elements. The media rendering device determines a first user interface mode based on the user profile. The first user interface mode may be associated with a first subset of user interface elements of the plurality of user interface elements. The media rendering device generates a graphical user interface (GUI) based on the first subset of user interface elements. The media rendering device controls a display device to display the generated GUI.

20 Claims, 11 Drawing Sheets

(56) References Cited

U.S. PATENT DOCUMENTS

| | | | |
|---|---|---|---|
| 2018/0063263 A1* | 3/2018 | Bandela | H04W 4/023 |
| 2020/0133631 A1* | 4/2020 | Christie | H04N 21/4753 |
| 2020/0260152 A1 | 8/2020 | Fishman | |
| 2020/0301567 A1 | 9/2020 | Park | |

FOREIGN PATENT DOCUMENTS

| | | |
|---|---|---|
| CN | 111970549 A | 11/2020 |
| WO | WO-0182596 A | 11/2001 |
| WO | WO-0196994 A | 12/2001 |

\* cited by examiner

SIMPLIFIED USER INTERFACE FOR MEDIA RENDERING DEVICE

CROSS-REFERENCE TO RELATED APPLICATIONS/INCORPORATION BY REFERENCE

None

FIELD

Various embodiments of the disclosure relate to a user interface for media rendering devices. More specifically, various embodiments of the disclosure relate to a media rendering device and method for generation of a simplified user interface for the media rendering device.

BACKGROUND

Advancements in the field of media rendering devices have led to the development of various user interfaces for access and navigation of content on the media rendering devices (for example, televisions or digital media players). Conventionally, a media rendering device may be capable of playing a variety of content in a variety of modes (for example, over-the-air mode, streaming mode, and so on), and may include a complex multi-functional graphical user interface to enable navigation of the content. For example, a typical graphical user interface may include several ribbons of icons, with multiple groupings and headings, to showcase content from a variety of sources. However, in certain situations, the graphical user interface may be too complicated and cumbersome to use for certain users (for example, elderly people or cognitively challenged people), because it may require them to navigate back and forth through multiple layers of icons and/or applications to locate their favorite content. Further, the media rendering device may come with a remote control that may include a large number of buttons for several functions and inputs. However, some of these functions or inputs may be applicable for specific modes of operation that may not make sense to certain users (for example, elderly people or cognitively challenged people), making it even more cumbersome to use the media rendering device. The current effort of manufacturers of the media rendering device is directed to achieving a common user interface that may be suitable for several groups of people, thereby making the user interfaces more and more complex to handle in future.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A media rendering device and method for generation of a simplified user interface is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
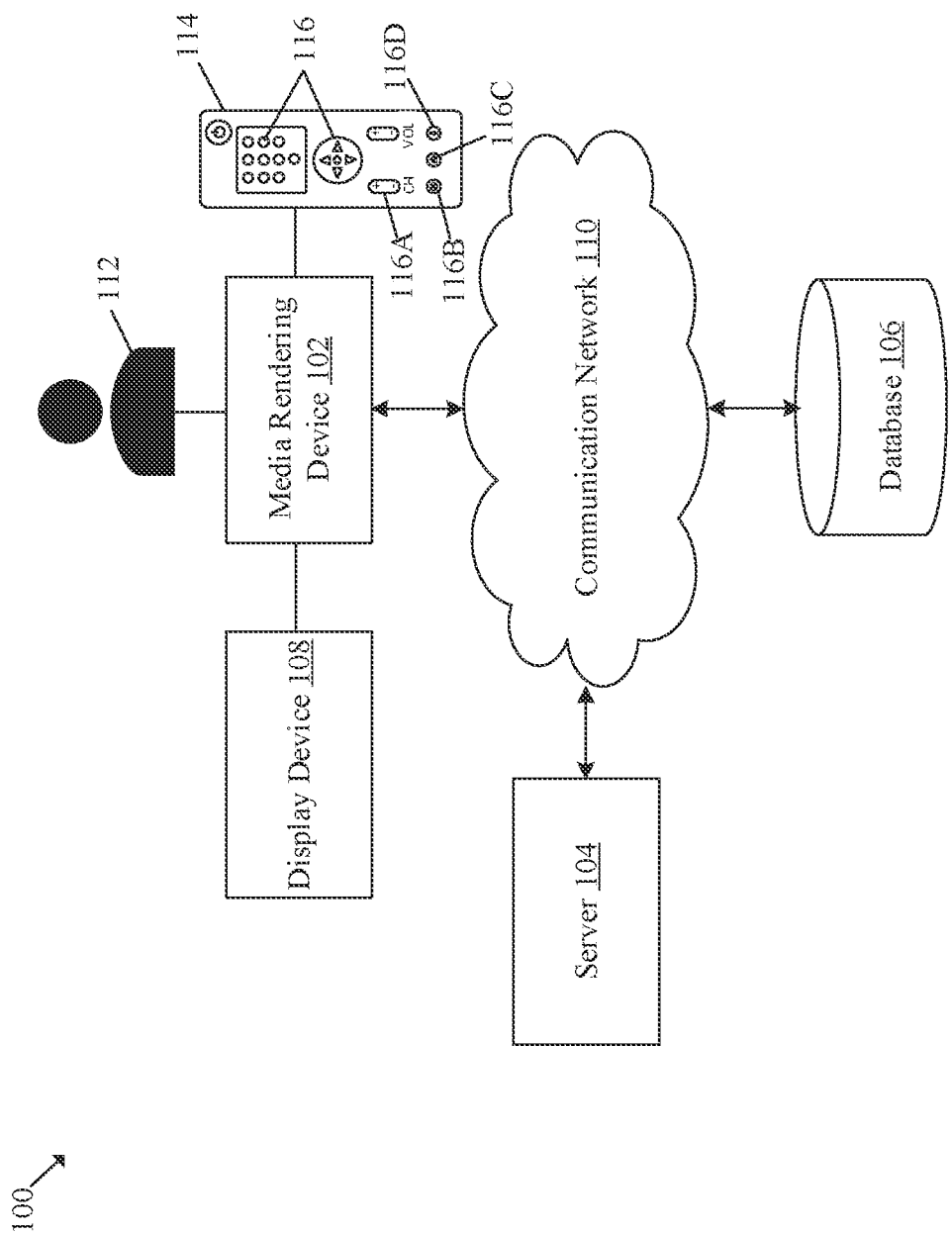
FIG. 1 is a block diagram that illustrates an exemplary network environment for generation of a simplified graphical user interface for a media rendering device, in accordance with an embodiment of the disclosure.

The following described implementation may be found in the disclosed media rendering device and method for generation of a simplified user interface. Exemplary aspects of the disclosure provide a media rendering device (for example, a television or a digital media player) which may provide a simplified user interface for the media rendering device. The media rendering device may be configured to determine a user profile associated with a user of the media rendering device. The media rendering device may include a plurality of user interface modes. The plurality of user interface modes may include a specific user interface mode (for example, a standard interface of the manufacturer of the media rendering device) associated with a plurality of user interface elements. In an example, the plurality of user interface elements may include, but not limited to, a plurality of icons related to selection of content (for example, media content), one or more configuration settings of the media rendering device, and a plurality of content access modes of the media rendering device. The media rendering device may be configured to determine a first user interface mode of the plurality of user interface modes based on the determined user profile of the user. The first user interface mode may be associated with a first subset of user interface elements of the plurality of user interface elements. The first subset of user interface elements may include at least one first user interface element corresponding to playback of content from a first content access mode of the plurality of content access modes, and at least one second user interface element corresponding to playback of content from a second content access mode, different from the first content access mode, of the plurality of content access modes. In an example, the plurality of content access modes may include, but not limited to, an over-the-air mode, a streaming mode, a recorded content mode, an online access mode, and so on.

The media rendering device may be configured to generate a graphical user interface based on the first subset of user interface elements (for example, a first subset of icons of the plurality of icons of the standard interface) of the first user interface mode. The media rendering device may control a display device to display the generated graphical user interface. In an embodiment, the media rendering device may disable one or more menu options (for example, audio setting menu, video setting menu), disable one or more input options, and hide one or more sub-menus from the generated graphical user interface for the determined user profile (for example, the user profile associated with an elderly person or a cognitively challenged person). The media rendering device may thereby provide a simplified graphical user interface that includes the first subset of icons, and may disable one or more menu options for the determined user profile. The simplified graphical user interface may have limited menu options (or no menu options) and limited functionality for the users (for example, elderly people, or cognitively challenged people) of the media rendering device. The media rendering device may also eliminate functions or inputs that may be applicable for specific modes of operation. The media rendering device may further output a notification indicating the invalidity of an input from a remote control, or may output a notification indicating the invalidity of the disabled menu options or functions that may be selected, thereby improving the usability of the media rendering device.

The media rendering device may further control the display device to display a limited number of icons corresponding to playback of select content items from different content access modes based on the determined user profile. The media rendering device may enable navigation between the content items, each corresponding to a different content access mode of the plurality of content access modes, based on user input indicative of consecutive selection of a set of navigation buttons (for example, channel up/down button or numeric buttons) on the remote control. For example, the media rendering device may enable navigation between the content items (or the associated icons) with one-press input of the set of navigation buttons, thereby providing a faithful and user-friendly manner to locate favorite content from different content access modes (such as over-the-air mode, streaming mode, recorded content mode, and/or online access mode). In an embodiment, the media rendering device may further allow curation of content for one or more user profiles using an administrator profile, such that each icon in the simplified graphical user interface of the determined user profile may be associated with a favorite content of the plurality of content items from different content access modes (such as over-the-air mode, streaming mode, recorded content mode, and/or online access mode).

FIG. 1 is a block diagram that illustrates an exemplary network environment for generation of a simplified graphical user interface for a media rendering device, in accordance with an embodiment of the disclosure. With reference to FIG. 1, there is shown a network environment 100. The network environment 100 may include a media rendering device 102, a server 104, a database 106, and a display device 108. The media rendering device 102, the server 104, and the database 106 may be communicatively coupled with each other, via a communication network 110. In the network environment 100, there is further shown a remote control 114 communicatively coupled with the media rendering device 102. The remote control 114 may be operable by the first user 112 to control the media rendering device 102.

The media rendering device 102 may include suitable logic, circuitry, interfaces, and/or code that may be configured to configured to play back content (for example, media content). The media rendering device 102 may be configured to communicate with the server 104 to receive the media content to be played back on the media rendering device 102 and to receive metadata associated with the media content. The media rendering device 102 may control the display device 108 to generate, based at least on the metadata, a graphical user interface with a plurality of user interface elements (for example, icons) related to selection of content, configuration settings of the media rendering device, and so on. The media rendering device 102 may be associated with a plurality of user profiles. Each user profile of the plurality of user profiles may include a collection of content items and settings or menu options. The media rendering device 102 may allow selection and/or switching of the user profile among the plurality of user profiles on the graphical user interface based on user input from the remote control 114. The media rendering device 102 may include an infrared receiver or a Bluetooth® interface to receive control signals transmitted from the remote control 114 corresponding to the button being pressed on the remote control 114. Examples of the media rendering device 102 may include, but are not limited to, a smart television, a digital media player, a display device, a mobile phone, a smart phone, a tablet computing device, a personal computer, a gaming console, a sound system, a smart audio device, a home theatre system, a digital camera, a head-mounted device, an automotive electronic device, or other consumer electronic device with media rendering capability. In accordance with an embodiment, the media rendering device 102 may playback content from different sources based on different access modes (for example, over-the-air mode, streaming mode, recorded content mode, and/or online access mode). The content may be media content stored on the media rendering device 102 (such as a personal video recorder (PVR)) or streamed from the server 104 (such as a media server) via the communication network 110 (such as the Internet). Examples of the media content may include, but are not limited to, images, animations (such as 2D/3D animations or motion graphics), audio/video data, conventional television programming (provided via traditional broadcast, cable, satellite, Internet, or other means), pay-per-view programs, on-demand programs (as in video-on-demand (VOD) systems), or Internet content (e.g., streaming media, downloadable media, webcasts, etc.).

In an embodiment, the media rendering device 102 may be configured to generate a simplified user interface based on the selection of a specific user profile among the plurality of user profiles. The simplified user interface may include a subset of user interface elements (for example, a subset of icons) of the plurality of user interface elements. The simplified user interface may disable one or more menu options and/or input options, and hide one or more submenus. The functionality of the generation of the simplified user interface may be integrated with the media rendering device 102 by the manufacturer of the media rendering device 102, or may be downloadable as an add-on application from the server 104 or an application store/marketplace.

The display device 108 may include suitable logic, circuitry, and interfaces that may be configured to display an output of the media rendering device 102. The display device 108 may be configured to display the graphical user interface generated by the media rendering device 102. The display device 108 may be further configured to display the media content being played back by the media rendering device 102. In an embodiment, the display device 108 may be an external display device connected to the media rendering device 102. For example, the display device 108 may be connected to the media rendering device 102 (such as a digital media player or a personal video recorder) by a wired connection (such as a high-definition multimedia interface (HDMI) connection) or a wireless connection (such as Wi-Fi). In another embodiment, the display device 108 may be integrated with the media rendering device 102 (such as a smart television). The display device 108 (such as a display screen with integrated audio speaker) may include one or more controllable parameters, such as, brightness, contrast, aspect ratio, color saturation, audio volume, etc. The media rendering device 102 may be configured to control the parameters of the display device 108 by transmitting one or more signals over the wired connection (such as the HDMI connection). The display device 108 may be a touch screen that may receive a user input via touch input. The touch screen may be at least one of a resistive touch screen, a capacitive touch screen, a thermal touch screen or any other touch screen through which inputs may be provided to the display device 108. The display device 108 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 108 may correspond to a display screen of a smart-glass device, a head-mounted display, a see-through display, a projection-based display, an electro-chromic display, and/or a transparent display. A person of ordinary skill in the art will understand that the scope of the disclosure may not be limited to the implementation of the display device 108 and the media rendering device 102 as two separate entities. In certain embodiments, the functionalities of the display device 108 may be incorporated in its entirety or at least partially in the media rendering device 102, without departing from the scope of the disclosure.

The remote control 114 may include suitable logic, circuitry, code, and/or interfaces to control one or more functionalities of the media rendering device 102 by transmission of control signals to the media rendering device 102. The remote control 114 may include a plurality of buttons 116 associated with a plurality of functions of the media rendering device 102. The remote control 114 may include an infrared transmitter or a Bluetooth® interface to transmit the control signals to the media rendering device 102 corresponding to a button of the plurality of buttons 116 being pressed. The functions that may be controlled using the remote control 114 may include, but are not limited to, navigation, volume, channel, playback, record, settings of the media rendering device 102, input source selection, a voice assistant, and so on. In an embodiment, the remote control 114 may be manufactured and packaged by the manufacturer of the media rendering device 102. As shown in FIG. 1, for example, the remote control 114 may comprise a plurality of buttons 116 including a set of navigation buttons (such as channel up/down button 116A and numeric buttons), a settings button 116B, a home button 116C, a voice button 116D, that may have functionalities associated therewith. It may be noted that the plurality of buttons 116 is presented merely as an example. The present disclosure may also be applicable to the remote control 114 including several other buttons (such as Source selection button, playback buttons, Power button, Volume buttons, etc.), without departing from the scope of the disclosure. A description of other buttons on the remote control 114 have been omitted for the sake of brevity.

The server 104 may include suitable logic, circuitry, and interfaces, and/or code that may be configured to provide subscription-based access or free access to a plurality of content items. The server 104 (for example, a media server) may be associated with a content provider. The server 104 may be configured to store information related to a plurality of user profiles associated with the media rendering device 102, user interface modes corresponding to the plurality of user profiles, viewing histories corresponding to the plurality of user profiles, and so on. In an exemplary embodiment, the server 104 may be implemented as a cloud server and may execute operations through web applications, cloud applications, HTTP requests, repository operations, file transfer, and the like. Other example implementations of the server 104 may include, but are not limited to, a database server, a file server, a web server, an application server, a mainframe server, or a cloud computing server. In at least one embodiment, the server 104 may be implemented as a plurality of distributed cloud-based resources by use of several technologies that are well known to those ordinarily skilled in the art. A person of ordinary skill in the art will understand that the scope of the disclosure may not be limited to the implementation of the server 104 and the media rendering device 102 as two separate entities. In certain embodiments, the functionalities of the server 104 may be incorporated in its entirety or at least partially in the media rendering device 102, without departing from the scope of the disclosure.

The database 106 may include suitable logic, interfaces, and/or code that may be configured to store a plurality of content items. The database 106 (for example, a media database) may be associated with the content provider. The database 106 may be a relational or a non-relational database. In some cases, the database 106 may be stored on a server, such as a cloud server, or may be cached and stored on the media rendering device 102. Additionally, or alternatively, the database 106 may be implemented using hardware including a processor, a microprocessor (e.g., to perform or control performance of one or more operations), a field-programmable gate array (FPGA), or an application-specific integrated circuit (ASIC). In some instances, the database 106 may be implemented using a combination of hardware and software. A person of ordinary skill in the art will understand that the scope of the disclosure may not be limited to the implementation of the server 104 and the database 106 as two separate entities. In certain embodiments, the functionalities of the database 106 may be incorporated in its entirety or at least partially in the server 104, without departing from the scope of the disclosure.

The communication network 110 may include a communication medium through which the media rendering device 102, the server 104, and the database 106 may communicate with one another. Examples of the communication network 110 may include, but are not limited to, the Internet, a cloud network, a Long-Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operation, the media rendering device 102 may receive a user input, for example, to turn-on the media rendering device 102. The media rendering device 102 may be configured to determine the user profile of the first user 112 of the media rendering device 102. In an example, the media rendering device 102 may determine the user profile of the first user 112 based on a user input indicative of a selection of the user profile from a plurality of user profiles. In another example, the media rendering device 102 may acquire one of a voice or an image of the first user 112, and may determine the user profile of the first user 112 based on the acquired one of the voice or the image of the first user 112. The user profile may be associated with at least one of age of the first user, content preferences of the first user, preferences related to configuration settings of the media rendering device, usage history associated with menus, or a viewing history of the first user. The determination of the user profile may be described, for example, in FIG. 4.

The media rendering device 102 may include a plurality of user interface modes, each corresponding to a user profile of the plurality of user profiles. The plurality of user interface modes may include a specific user interface mode (for example, the standard mode of the media rendering device) associated with a plurality of user interface elements. In an example, the plurality of user interface elements may include, but not limited to, a plurality of icons related to selection of the content from the plurality of content access modes, one or more configuration settings of the media rendering device 102, the plurality of content access modes of the media rendering device 102, and so on. The specific user interface mode may be described, for example in FIG. 3B.

The media rendering device 102 may be configured to determine a first user interface mode of the plurality of user interface modes based on the determined user profile of the first user 112. The first user interface mode may be associated with a first subset of user interface elements of the plurality of user interface elements. The first subset of user interface elements may include, but not limited to, at least one first user interface element (such as a first icon) corresponding to playback of content from a first content access mode of a plurality of content access modes, and at least one second user interface element (such as a second icon) corresponding to playback of content from a second content access mode, of the plurality of content access modes, different from the first content access mode. In an example, the plurality of content access modes may include, but are not limited to, over-the-air mode, streaming mode, recorded content mode, online access mode, and so on. The determination of the first user interface mode is described, for example, in FIG. 4.

The media rendering device 102 may be configured to generate a simplified graphical user interface based on the first subset of user interface elements (such as first subset of icons) of the first user interface mode. The simplified graphical user interface may include the first subset of icons (for example, a limited number of icons) corresponding to select content items. The media rendering device 102 may be configured to control the display device 108 to display the generated simplified graphical user interface for the determined user profile, as described, for example, in FIG. 4. The simplified graphical user interface may have limited menu options (or no menu options) and limited functionality for the users (for example, elderly people, or cognitively challenged people) of the media rendering device 102. The media rendering device 102 may control the display device 108 to display the limited number of icons corresponding to playback of select content items from different content access modes. The media rendering device 102 may enable navigation between the content items, each corresponding to a different content access mode of the plurality of content access modes, based on user input indicative of consecutive selection of a set of navigation buttons (for example, channel up/down button 116A or numeric buttons) on the remote control 114. For example, the media rendering device 102 may enable navigation between the content items (or the associated icons) with one-press input of the set of navigation buttons, thereby providing a faithful and user-friendly manner to locate favorite content from different content access modes (such as over-the-air mode, streaming mode, recorded content mode, and/or online access mode).

In an embodiment, the media rendering device 102 may determine setting information associated with the determined user profile of the first user 112. The media rendering device 102 may disable at least one menu option of the media rendering device 102 or at least one input option of the media rendering device 102, based on the determined setting information. The media rendering device 102 may also eliminate functions or inputs that may be applicable for specific modes of operation.

In an embodiment, the media rendering device 102 may be configured to hide one or more sub-menus from the generated graphical user interface for the determined user profile. The one or more sub-menus may be associated with the plurality of content access modes or configuration settings of the media rendering device 102. The media rendering device 102 may control the display device to display the generated graphical user interface based on the hidden one or more sub-menus.

The media rendering device 102 may receive a user input indicative of selection of one of the at least one menu option, at least one function, or the at least one input option that have been disabled. The media rendering device 102 may be configured to output a notification indicative of the invalidity of the selected one of the at least one menu option, the at least one function, or the at least one input option, thereby improving the usability of the media rendering device 102 for the users.

Figure 2:
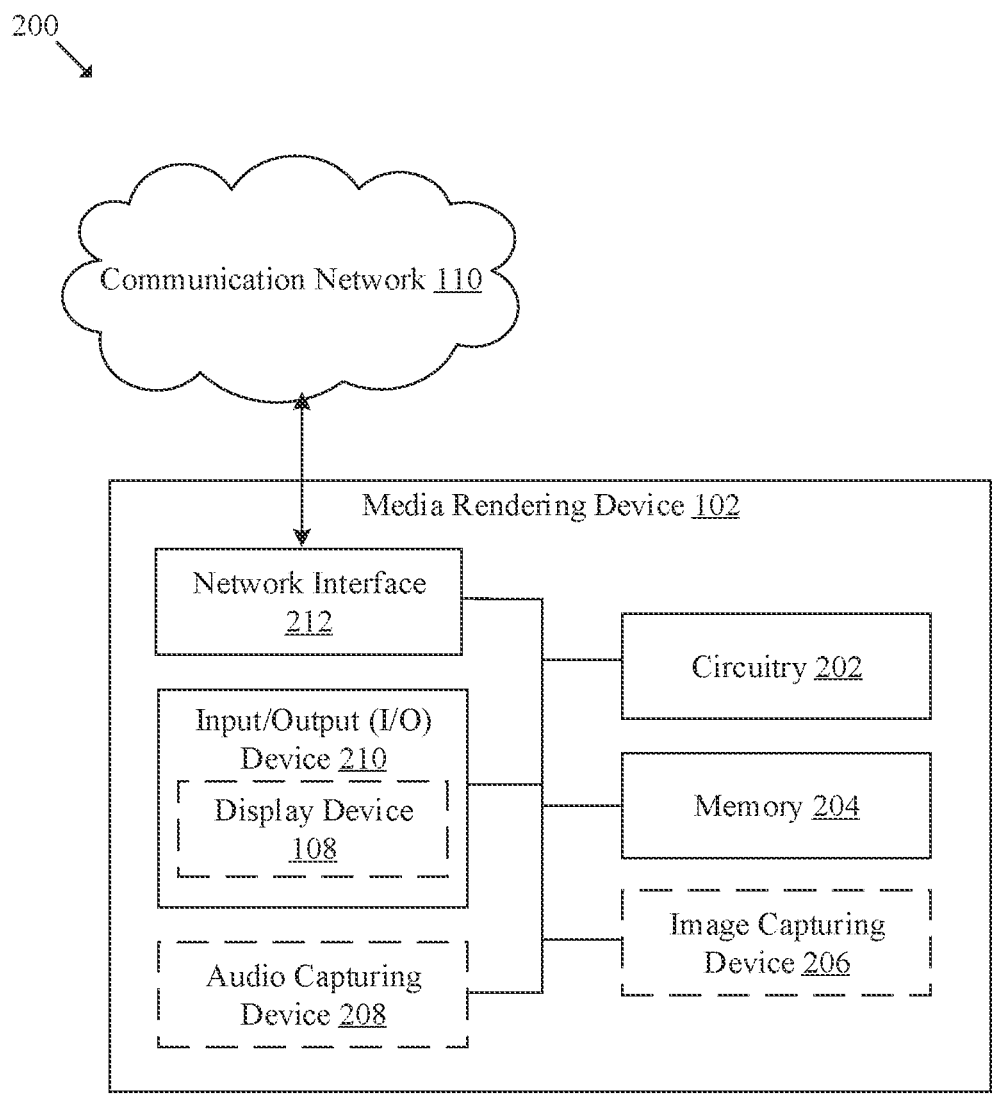
FIG. 2 is a block diagram that illustrates an exemplary media rendering device, in accordance with an embodiment of the disclosure.

FIG. 2 is a block diagram that illustrates an exemplary media rendering device, in accordance with an embodiment of the disclosure. FIG. 2 is explained in conjunction with elements from FIG. 1. With reference to FIG. 2, there is shown the media rendering device 102. The media rendering device 102 may include circuitry 202, a memory 204, an image capturing device 206, an audio capturing device 208, an input/output (I/O) device 210, and a network interface 212. The I/O device 210 may include the display device 108. The network interface 212 may be configured to connect the media rendering device 102 with the server 104, and the database 106, via the communication network 110.

The circuitry 202 may include suitable logic, circuitry, and/or interfaces that may be configured to execute program instructions associated with different operations to be executed by the media rendering device 102. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The memory 204 may be configured to store information related to a plurality of user profiles associated with the media rendering device 102, user interface modes corresponding to the plurality of user profiles, usage histories and viewing histories corresponding to the plurality of user profiles, and so on. The memory 204 may be further configured to store setting information associated with the user profile of each user of the media rendering device 102, and authentication information associated with an administrator profile. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The image capturing device 206 may include suitable logic, circuitry, interfaces, and/or code that may be configured to capture an image of the first user 112 of the media rendering device 102. The image capturing device 206 may be further configured to transfer the captured image of the first user 112 to the circuitry 202. The circuitry 202 may be configured to determine the user profile of the first user 112 of the media rendering device 102 based on the captured image of the first user 112. Examples of the image capturing device 206 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices. A person of ordinary skill in the art will understand that the scope of the disclosure may not be limited to the implementation of the image capturing device 206 integrated with the media rendering device 102. In certain embodiments, the image capturing device 206 and the media rendering device 102 may be implemented as separate entities, without departing from the scope of the disclosure.

The audio capturing device 208 may include suitable logic, circuitry, interfaces, and/or code that may be configured to capture an audio signal (for example, voice) of the first user 112. The audio capturing device 208 may be further configured to convert the captured audio signal into an electrical signal for processing. The circuitry 202 may be configured to determine the user profile of the first user 112 of the media rendering device 102 based on the acquired voice of the first user 112. Examples of the audio capturing device 208 may include, but are not limited to, a recorder, an electret microphone, a dynamic microphone, a carbon microphone, a piezoelectric microphone, a fiber microphone, a (micro-electro-mechanical-systems) MEMS microphone, or other microphones known in the art. A person of ordinary skill in the art will understand that the scope of the disclosure may not be limited to the implementation of the audio capturing device 208 integrated with the media rendering device 102. In certain embodiments, the audio capturing device 208 and the media rendering device 102 may be implemented as separate entities, without departing from the scope of the disclosure.

The I/O device 210 may include suitable logic, circuitry, interfaces, and/or code that may be configured to receive an input and provide an output based on the received input. The I/O device 210 may include various input and output devices, which may be configured to communicate with the circuitry 202. In an example, the media rendering device 102 may receive, via the I/O device 210, the user input indicative of a selection of the at least one menu option or the at least one input option. In another example, the media rendering device 102 may receive, via the I/O device 210, the user input indicative of a selection of the user profile from the plurality of user profiles. Examples of the I/O device 210 may include, but are not limited to, a touch screen, a keyboard, a mouse, a joystick, a display device (for example, the display device 108), a microphone, or a speaker.

The network interface 212 may include suitable logic, circuitry, interfaces, and/or code that may be configured to facilitate communication between the media rendering device 102, the server 104, and the database 106, via the communication network 110. The network interface 212 may include an infrared receiver or a Bluetooth® interface to receive control signals transmitted from the remote control 114. The network interface 212 may be implemented by use of various known technologies to support wired or wireless communication of the media rendering device 102 with the communication network 110. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). Various operations of the circuitry 202 for generation of the simplified user interface for the media rendering device 102 are described, for example, in FIGS. 3A, 3B, 4, 5A, 5B, 5C, 6, 7, 8A, 8B, 8C, and 8D.

Figure 3A:
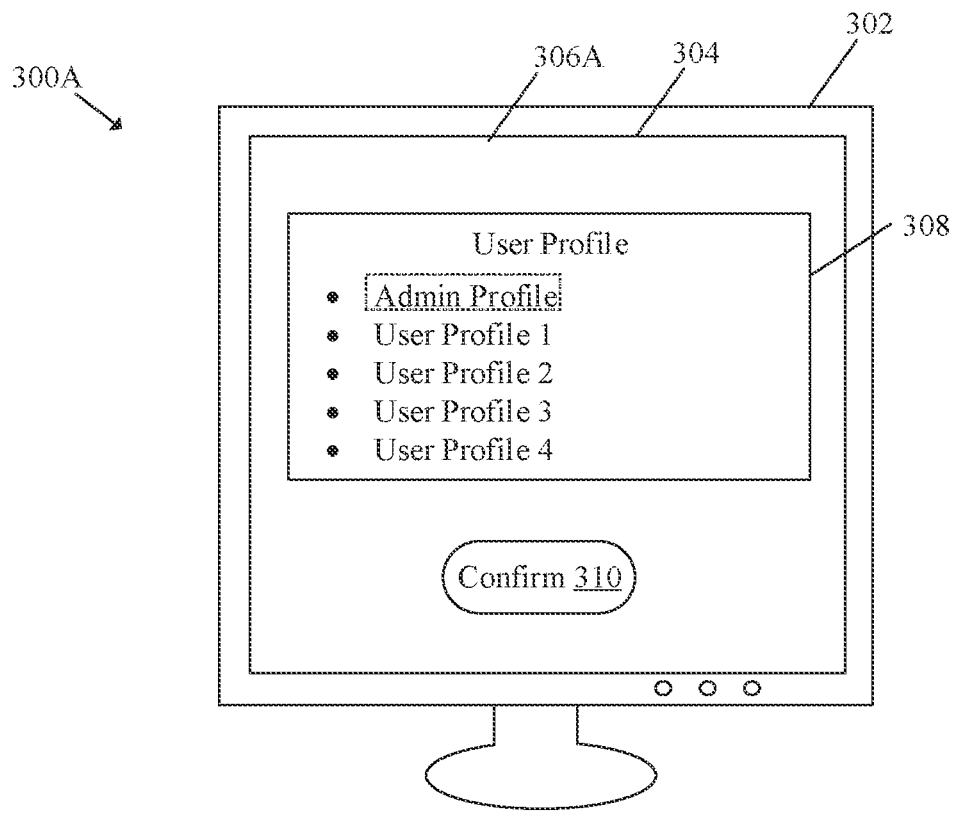
FIG. 3A is a diagram that illustrates an exemplary scenario for selection of a user profile on a media rendering device, in accordance with an embodiment of the disclosure.

FIG. 3A is a diagram that illustrates an exemplary scenario for selection of a user profile on a media rendering device, in accordance with an embodiment of the disclosure. FIG. 3A is described in conjunction with elements from FIGS. 1 and 2. With reference to FIG. 3A, there is shown an exemplary scenario 300A. In the exemplary scenario 300A, there are shown a media rendering device 302 and a user interface for selection of a user profile on the media rendering device 302. The media rendering device 302 may be an exemplary implementation of the media rendering device 102 of FIG. 1. The media rendering device 302 may further include a display screen 304, which may be an exemplary implementation of the display device 108.

It may be noted that the media rendering device 302 is presented as a smart television merely as an example. The present disclosure may also be applicable to other types of the media rendering device 302, for example, a mobile phone, a digital media player with external display, a set-top box with external display, a tablet etc., and other devices that may have a capability to perform the functions as described and illustrated for the media rendering device 102. A description of other types of devices having similar functionalities as the media rendering device 102 is omitted from the disclosure for the sake of brevity.

In the exemplary scenario 300A, the circuitry 202 may generate a graphical user interface 306A. The graphical user interface 306A may correspond to a user interface (UI) rendered on the display screen 304. The graphical user interface 306A may be configured to display graphical elements that may include user-selectable options, user confirmation option, and other interactive user-options. In some embodiments, the graphical user interface 306A may be rendered on an external display device communicatively coupled to the media rendering device 302.

In the graphical user interface 306A, there is shown a first user interface (UI) element 308 and a second UI element 310, through which an input may be accepted from the first user 112, and an output may be provided to the first user 112. The first UI element 308 and the second UI element 310 may be associated with input elements of the graphical user interface 306A.

The first UI element 308 may correspond to a selection box. The first UI element 308 may be configured to receive a user input indicative of a selection of a user profile from the plurality of user profiles. For example, the plurality of user profiles may include, but not limited to, an admin profile, user profile 1 of the first user 112, user profile 2 of a second user, user profile 3 of a third user, and user profile 4 of a fourth user of the media rendering device 302. It may be noted that the plurality of user profiles in FIG. 3A is presented merely as an example. The exemplary scenario 300A may include other user profiles, without deviating from the scope of disclosure.

In an embodiment, the second UI element 310 may be, for example, a button that may be configured to receive a user confirmation of the selected user profile in the first UI element 308. The circuitry 202 may determine the user profile of the administrator user of the media rendering device 302 based on the selection of "Admin profile" in the first UI element 308 and the user confirmation through the second UI element 310.

As shown in FIG. 3A, the selection of the Admin profile may be highlighted by a dotted line or other highlighting feature (for example, boldfacing of selected user profile or a marked checkbox). The administrator user may have privileges to control configuration settings of the media rendering device 302. The administrator user may be permitted to modify settings for all the user profiles, and may prohibit other users from modifying settings of the media rendering device 302. The Admin profile may be access-restricted using a password, as described in FIG. 8A.

Figure 3B:
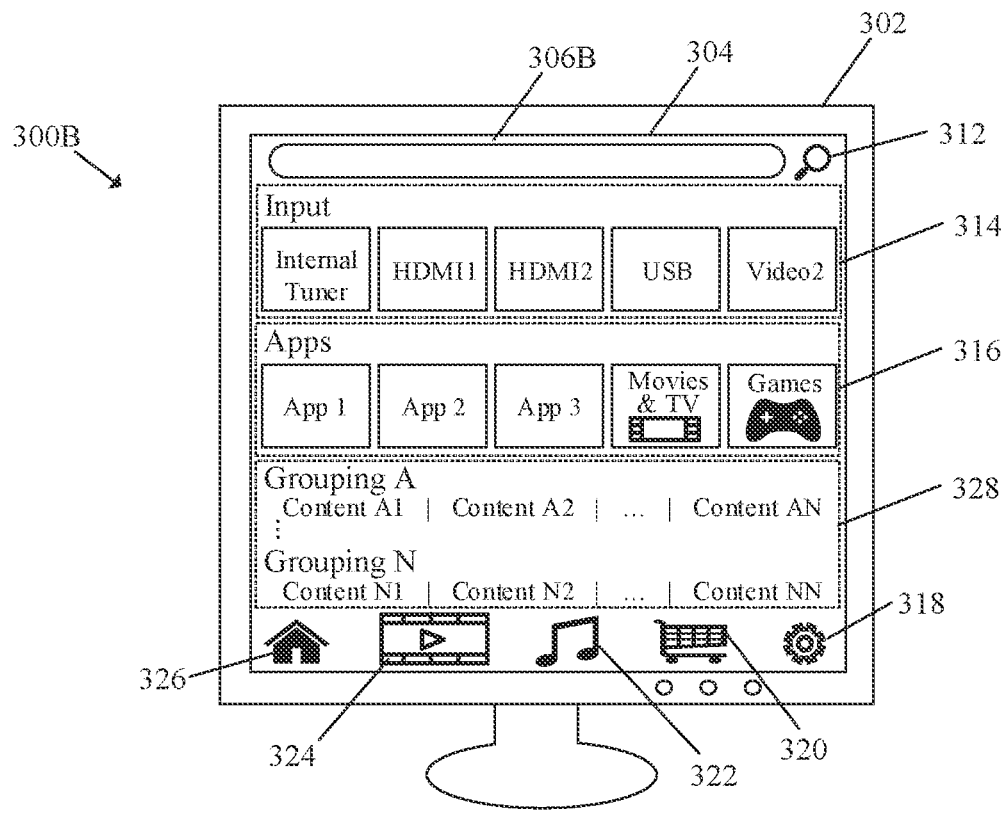
FIG. 3B is a diagram that illustrates an exemplary scenario for display of a graphical user interface on a media rendering device in a specific user interface mode, in accordance with an embodiment of the disclosure.

FIG. 3B is a diagram that illustrates an exemplary scenario for display of a graphical user interface on a media rendering device in a specific user interface mode, in accordance with an embodiment of the disclosure. FIG. 3B is described in conjunction with elements from FIGS. 1, 2, and 3A. With reference to FIG. 3B, there is shown an exemplary scenario 300B. In the exemplary scenario 300B, there is shown a standard graphical user interface of the media rendering device 302. The media rendering device 302 may include the display screen 304 that may display the standard graphical user interface 306B.

In the exemplary scenario 300B, upon confirmation of the Admin profile in FIG. 3A, the circuitry 202 may control the display screen 304 to display the standard graphical user interface 306B in the specific user interface mode (such as a normal user interface mode). The specific user interface mode may correspond to the standard user interface provided by the manufacturer of the media rendering device 302. The specific user interface mode may be associated with a plurality of user interface elements (such as a third UI element 312, a fourth UI element 314, a fifth UI element 316, a sixth UI element 318, a seventh UI element 320, an eighth UI element 322, a ninth UI element 324, and a tenth UI element 326, and an eleventh UI element 328). The plurality of user interface elements may include a plurality of icons related to the content from the plurality of content access modes, one or more configuration settings of the media rendering device 302, and the plurality of content access modes of the media rendering device 302. It may be noted that the plurality of user interface elements (such as the third UI element 312, the fourth UI element 314, the fifth UI element 316, the sixth UI element 318, the seventh UI element 320, the eighth UI element 322, the ninth UI element 324, the tenth UI element 326, and the eleventh UI element 328) is presented merely as an example. The exemplary scenario 300B may include fewer or additional UI elements, without deviating from the scope of disclosure.

The third UI element 312, may be for example, a search icon that may be configured to receive user input of a keyword indicative of one or more configuration settings of the media rendering device 302, or a content item to be searched on the media rendering device 302. In an embodiment, the fourth UI element 314 may correspond to a selection box configured to receive a user input indicative of a selection of an input source from a plurality of input sources associated with the media rendering device 302. For example, the plurality of input sources may include, but not limited to, an internal tuner, High-definition Multimedia Interface (HDMI) 1, HDMI 2, Universal serial bus (USB) input, video input, and so on. It may be noted that, the plurality of input sources is presented merely as an example. The exemplary scenario 300B may include other input sources, without deviating from the scope of the disclosure.

A description of the plurality of input sources is omitted from the disclosure for the sake of brevity.

In an embodiment, the fifth UI element 316 may correspond to a selection box configured to receive a user input indicative of a selection of an application from a plurality of applications on the media rendering device 302. The plurality of applications may each correspond to a content provider. For example, the plurality of applications may include, but not limited to, App1 (for example, Netflix®), App2 (for example, Prime® videos), App3 (for example, YouTube®), Google® movies and TV, or Google® games, and so on. It may be noted that the plurality of applications in the exemplary scenario 300B is presented merely as an example. The exemplary scenario 300B may include additional applications (for example, SonyLiv®), without deviating from the scope of disclosure. A description of the plurality of applications is omitted from the disclosure for the sake of brevity.

In an embodiment, the sixth UI element 318 may correspond to, for example, a settings icon configured to open a settings menu of the media rendering device 302. The seventh UI element 320 may correspond to, for example, a shopping cart icon configured to receive a user input indicative of a selection of content items to be purchased by the user of the media rendering device 302. The eighth UI element 322 may correspond to, for example, a music icon configured to receive a user input indicative of a request for music content available for playback on the media rendering device 302. The ninth UI element 324 may correspond to, for example, a video icon configured to receive a user input indicative of a request for video content available for playback on the media rendering device 302. The tenth UI element 326 may correspond to, for example, a Home icon configured to receive a user input indicative of a request for Home screen or the main menu of the standard graphical user interface 306B of the media rendering device 302. Each of the menu items corresponding to the third UI element 312, the fourth UI element 314, the sixth UI element 318, the seventh UI element 320, the eighth UI element 322, and the ninth UI element 324 may include one or sub-menus that may be presented upon selection of the respective menu item.

In an embodiment, the eleventh UI element 328 may correspond to a selection box configured to receive a user input indicative of a selection of a content items from a plurality of content items available for playback on the media rendering device 302. The eleventh UI element 328 may include a plurality of content groupings, such as, Grouping A to Grouping N. The plurality of content groupings may include "Comedy", "Drama", "Action", "TV shows", "Most Watched", "Recommended For You", and so on. Each grouping of the plurality of content groupings may include a ribbon list of icons corresponding to the content items (such as content items A1-AN, content items N1-NN) associated with the respective grouping. For example, the content items listed under the grouping "Recommended For You" may include content items selected based on the viewing history of the corresponding user (for example, the Admin user).

Figure 4:
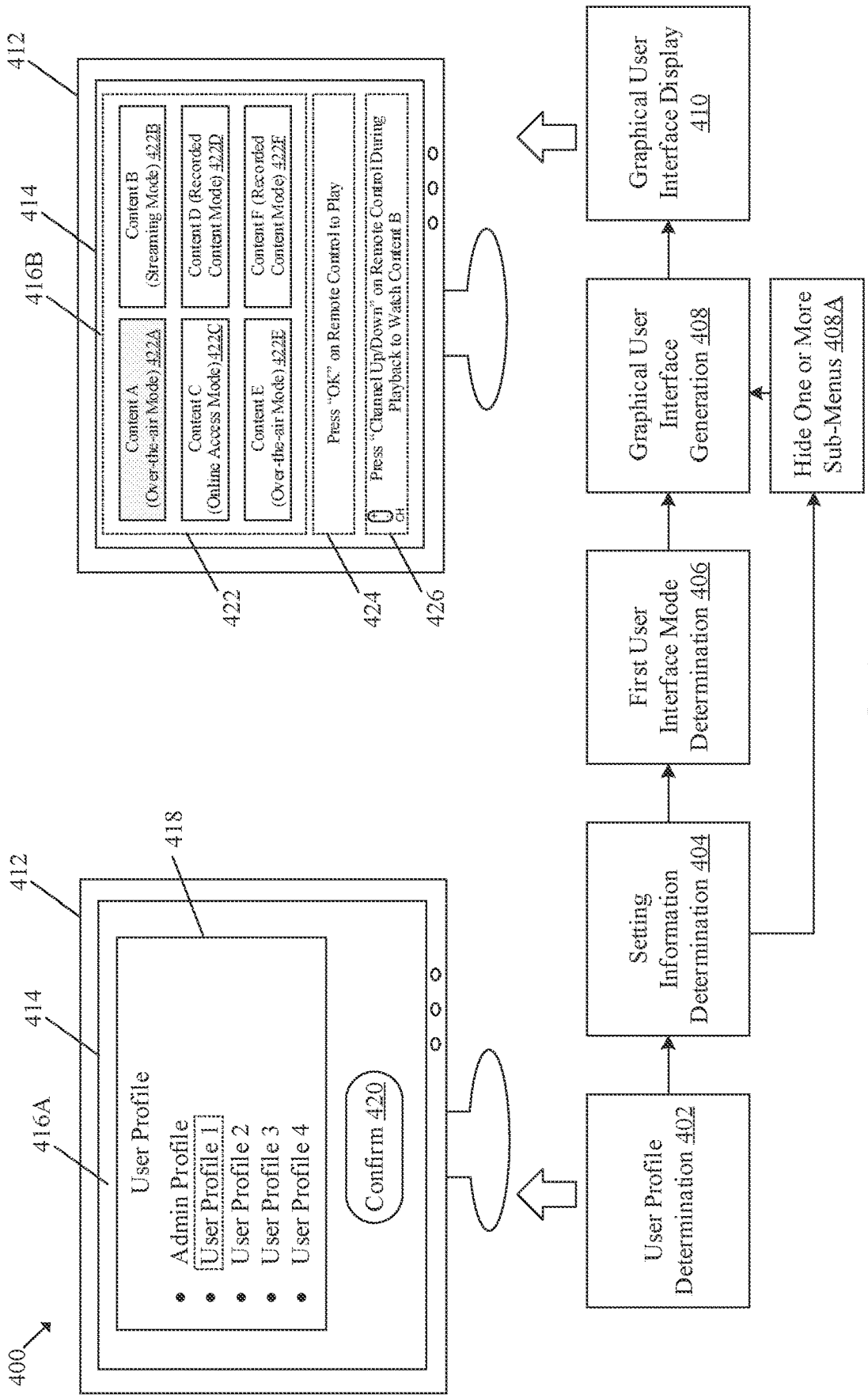
FIG. 4 is a diagram that illustrates exemplary operations for generation of a simplified graphical user interface for a media rendering device in a second user interface mode, in accordance with an embodiment of the disclosure.

FIG. 4 is a diagram that illustrates exemplary operations for generation of a simplified graphical user interface for a media rendering device in a second user interface mode, in accordance with an embodiment of the disclosure. FIG. 4 is described in conjunction with elements from FIGS. 1, 2, 3A, and 3B. With reference to FIG. 4, there is shown a block diagram 400 that illustrates exemplary operations from 402 to 410, as described herein. The exemplary operations illustrated in the block diagram 400 may start at 402 and may be performed by any computing system, apparatus, or device, such as by the media rendering device 102 of FIG. 1, the circuitry 202 of FIG. 2, or the media rendering device 412. The media rendering device 412 may be an exemplary implementation of the media rendering device 102 of FIG. 1. The media rendering device 412 may include a display screen 414. The display screen 414 may be an exemplary implementation of the display device 108.

At 402, a user profile may be determined. In an embodiment, the circuitry 202 may be configured to determine the user profile of a first user (such as the first user 112) among a plurality of user profiles of the media rendering device 412. In an embodiment, the media rendering device 412 may receive a user input indicative of a selection of the user profile from the plurality of user profiles. The media rendering device 412 may be configured to determine the user profile of the first user 112 of the media rendering device 412 based on the received user input. The user profile of the first user 112 may correspond to a current user who wishes to view content on the media rendering device 412. For example, there is shown the selection of "user profile 1" on the media rendering device 412.

In an embodiment, the circuitry 202 may generate and display a graphical user interface 416A on the display screen 414 of the media rendering device 412. The graphical user interface 416A may be an exemplary implementation of the graphical user interface 306A. The graphical user interface 416A may include a first user interface (UI) element 418 and a second UI element 420. The first UI element 418 and the second UI element 420 may be associated with input elements of the graphical user interface 416A. The first UI element 418 may correspond to a selection box that may be configured to receive a user input indicative of a selection of the user profile (for example, a name) from the plurality of user profiles (for example, a plurality of names). The second UI element 420 may be a button that may be configured to receive a user confirmation of the selection in the first UI element 418. The circuitry 202 may determine the user profile of the first user 112 of the media rendering device 412 based on the selection of "user profile 1" in the first UI element 418 and the user confirmation through the second UI element 420. The circuitry 202 may then retrieve the corresponding user profile from the plurality of user profiles stored in the memory 204.

In an embodiment, the media rendering device 412 may include one or more I/O devices such as, but not limited to, an image capturing device (such as the image capturing device 206), or an audio capturing device (such as the audio capturing device 208) to determine the user profile from the plurality of user profiles. The circuitry 202 may be configured to acquire one of a voice or an image of the first user 112, and determine the user profile of the first user 112 of the media rendering device 412 based on the acquired voice or the image of the first user 112. In an example, the circuitry 202 may apply one or more processing techniques (such as, face recognition) on the acquired image of the first user 112 to determine the user profile of the first user 112. In another example, the circuitry 202 may apply one or more voice detection techniques on the acquired voice of the first user 112 to determine the user profile of the first user 112. In an embodiment, the circuitry 202 may be configured to receive voice of the first user 112 via the remote control 114. For example, in response to pressing the voice button 116D on the remote control 114, the circuitry 202 may be configured to acquire the voice of the first user 112, and determine the user profile based on the acquired voice.

In some embodiments, the user profile of the first user 112 may be associated with an age of the first user 112, content preferences of the first user 112, preferences related to configuration settings of the media rendering device 412, or a viewing history of the first user 112. For example, the content preferences of the first user 112 may correspond to a favorite TV series or sport watched frequently by the first user 112. The preferences related to configuration settings of the media rendering device 412 may correspond to preferred configuration setting of the media rendering device 412 that may include, but are not limited to, a display setting, a menu rendering device 412. The circuitry 202 may be configured to disable one or more menu options in the simplified graphical user interface 416B, hide one or more sub-menus in the simplified graphical user interface 416B, or disable one or more input options of the media rendering device 412 based on the setting information for the determined user profile. The circuitry 202 may be configured to store the setting information associated with each user profile in the memory 204 in the form of a look up table, as shown in Table 1.

TABLE 1

Setting Information associated with user profile.

| User Profile | Input Options | | | Menu options | | | |
| --- | --- | --- | --- | --- | --- | --- | --- |
| | Input Source | | DVR/ | | | | |
| | Selection HDMI/USB/TV | Voice input | playback controls | Audio Setting | Language Setting | Display Setting | Tuner |
| Admin Profile | Enable | Enable | Enable | Enable | Enable | Enable | Enable |
| User Profile 1 | Disable | Disable | Disable | Disable | Disable | Disable | Enable |
| User Profile 2 | Disable | Enable | Disable | Enable | Disable | Enable | Enable |
| User Profile 3 | Disable | Disable | Disable | Enable | Disable | Enable | Enable | setting, a closed caption setting, a home page setting, a font setting, a color setting (for example, color warmth), network setting, security setting, an accessibility setting (for example, closed caption setting), an audio setting (for example, volume, audio balance), a hardware setting, or a software setting associated with the media rendering device 412. Examples of the display setting may include, but are not limited to, screen resolution/aspect ratio setting, picture mode, backlight setting, a brightness setting, and so on of the media rendering device 412. The home page setting may correspond to a preference related to an arrangement of user interface elements (for example, icons) and menus on a home screen of the media rendering device 412. The font setting may correspond to, but is not limited to, a font size, a font style, and a font color of text on the graphical user interface of the media rendering device 412.

The viewing history of the first user 112 may include information regarding type or genre of media content viewed by the first user 112 over a period of time. Examples of the genre of the media content may include but not limited to action, adventure, animation/anime, biopic, children, comedy, crime/detective/spy, documentary, drama, horror, family, fantasy, historical, musical, paranormal, romance, sports, science-fiction, talk show, suspense/thriller, war, western, and so on. For example, based on the determination of the user profile of the first user 112, the circuitry 202 may determine the age of the first user as 60 years, content preferences as sports events and comedy shows, and viewing history of the first user 112 as 60's TV shows.

At 404, setting information may be determined. In an embodiment, the circuitry 202 may be configured to determine the setting information associated with the determined user profile of the first user 112. The setting information may correspond to information associated with a status (such as enable status, or disable status) of one or more menu options of a simplified graphical user interface 416B, one or more sub-menus, and one or more input options of the media It should be noted that the setting information associated with each user profile shown in Table 1 is presented merely as exemplary data. The present disclosure may also be applicable to other menu options or input options of the media rendering device 412, without departing from the scope of the disclosure. A description of other menu options, or input options of the media rendering device 412 has been omitted from the disclosure for the sake of brevity. As shown in Table 1, all the input options and menu options may be enabled for the Admin profile. For other user profiles, some of the input options and menu options may be disabled. In an embodiment, the circuitry 202 may enable the administrator user to modify the setting information associated with each user profile, as described in FIG. 8C. In another embodiment, the circuitry 202 may automatically determine the setting information for the selected user profile based on, but not limited to, an age of the first user 112, preferences of the first user 112 related to the menu options or input options, or a usage history of the first user 112 related to the menu options or input options.

At 406, a first user interface mode may be determined. In an embodiment, the media rendering device 412 may be configured to determine the first user interface mode of the plurality of user interface modes based on the determined user profile of the first user 112. The first user interface mode may correspond to a user interface mode different from the standard user interface mode of the media rendering device 412 as described, for example, in FIG. 3B. The first user interface mode may be associated with a first subset of user interface elements of the plurality of user interface elements shown in FIG. 3B. The first subset of user interface elements may include fewer user interface elements (or fewer icons) compared to the plurality of user interface elements shown in FIG. 3B.

The first subset of user interface elements may include, but not limited to, at least one first user interface element corresponding to playback of content from a first content access mode of the plurality of content access modes, and at least one second user interface element corresponding to playback of content from a second content access mode, of the plurality of content access modes, different from the first content access mode. The plurality of content access modes may include, but are not limited to, over-the-air mode, streaming mode, recorded content mode, and online access mode. The over-the-air mode may correspond to a television broadcasting mode by a service provider for example, but not limited to, a satellite broadcaster, a terrestrial broadcaster, a digital television broadcaster, a cellular network broadcaster, or Internet broadcaster. The streaming mode may correspond to a video-on-demand service or a streaming media service from streaming content providers. The recorded content mode may correspond to stored content from a digital video recorder, universal serial bus (USB) drive, etc. The online access mode may correspond to content from online media sharing platforms or websites.

At 408, the simplified graphical user interface 416B may be generated. In an embodiment, the circuitry 202 may be configured to generate the simplified graphical user interface 416B based on the first subset of user interface elements of the determined first user interface mode. The simplified graphical user interface 416B may be a simplified user interface for the determined user profile of the first user 112, and may have fewer menu options, fewer sub-menus, or fewer input options as compared to the standard graphical user interface 306B associated with the specific user interface mode described in FIG. 3B. For example, the simplified graphical user interface 416B may exclude one or more of the third UI element 312, the fourth UI element 314, the fifth UI element 316, the sixth UI element 318, the seventh UI element 320, the eighth UI element 322, and the ninth UI element 324 of the standard graphical user interface 306B shown in FIG. 3B.

At 408A, one or more sub-menus may be hidden. In an embodiment, the circuitry 202 may be configured to hide one or more sub-menus from the generated simplified graphical user interface 416B. The one or more sub-menus may be associated with the plurality of content access modes or configuration settings of the media rendering device 412. The one or more sub-menus may correspond to specific sub-options related to each of the menu options. For example, the menu option (such as display settings) corresponding to the sixth UI element 318 may include sub-menus related to aspect ratio, resolution, color space, brightness, contrast, and so on. In another example, the menu option (such as input source selection) corresponding to the fourth UI element 314 may include the sub-menus related to HDMI1, HDMI2, USB1, USB2, TV, AV, and so on. The circuitry 202 may be configured to hide one or more of these sub-menus in the simplified graphical user interface 416B to reduce the complexity of the menu options, thereby providing a simpler user interface. For example, in a case where the menu option corresponding to the sixth UI element 318 is presented in the simplified graphical user interface 416B, the circuitry 202 may be configured to present the sub-menu related to brightness, and hide the sub-menus related to aspect ratio, resolution, color space, brightness, contrast, and so on. Similarly, in a case where the menu option corresponding to the fourth UI element 314 is presented, the circuitry 202 may be configured to hide the sub-menus related to HDMI1, HDMI2, USB1, USB2, TV, AV, and so on.

At 410, the display of the generated simplified graphical user interface 416B may be performed. In an embodiment, the circuitry 202 may be configured to control the display screen 414 to display the generated simplified graphical user interface 416B. In an embodiment, the circuitry 202 may be configured to control the display screen 414 to display the generated graphical user interface based on the disabled menu options, disabled input options, and the hidden one or more sub-menus. For example, the simplified graphical user interface 416B may include a third UI element 422. The third UI element 422 may correspond to a selection box configured to receive a user input indicative of a selection of a content item from a content list. The third UI element 422 may include the first subset of the icons (for example, a limited number of icons compared to the standard graphical user interface 306B of FIG. 3B), including one or more icons (such as icon 422A and icon 422E) corresponding to playback of content items (such as content A and content E) from a first content access mode (such as over-the-air mode), and one or more icons (such as icon 422D and icon 422F) corresponding to playback of content items (such as content D and content F) from a second content access mode (such as the recorded content mode), different from the first content access mode. The first subset of the icons may further include an icon (such as icon 422B) corresponding to playback of content item (such as content B) from a third content access mode (such as the streaming mode), and an icon (such as icon 422C) corresponding to playback of content item (such as content C) from a fourth content access mode (such as the online access mode). In an embodiment, as shown in FIG. 4, the simplified graphical user interface 416B may further exclude the plurality of content groupings corresponding to the eleventh UI element 328 shown in FIG. 3B.

It may be noted the content access mode is shown along with the content item in FIG. 4 for illustration purposes only, and may not be displayed along with the content item in the simplified graphical user interface 416B. In an embodiment, the content to be showcased in the third UI element 422 for playback may be curated by the administrator user, as described, for example, in FIG. 8D. In another embodiment, the content to be showcased in the third UI element 422 for playback may be automatically selected based on the viewing history of the first user 112. It may be noted that the number of icons (for example, icons 422A-422F) corresponding to content items (such as content A to content F) shown in the simplified graphical user interface 416B of FIG. 4 is presented merely as an example. The present disclosure may also be applicable to the simplified graphical user interface 416B having fewer or more icons and corresponding content items based on the selected user profile, without departing from the scope of the disclosure.

In an embodiment, the circuitry 202 may be further configured to navigate between the plurality of content items (such as content A to content F), based on user input indicative of consecutive selection of the set of navigation buttons (for example, the channel up/down button 116A or numeric buttons) on the remote control 114. The navigation between content items (such as content A to content F) using the channel up/down button 116A or numeric buttons may simulate the navigation between content on legacy cable television. In an example, the circuitry 202 may allow navigation between content items (such as content A to content F) based on reception of input corresponding to the channel up/down button 116A or numeric buttons on the remote control 114. In other words, the circuitry 202 may switch from content A corresponding to the over-the-air mode to content B corresponding to the streaming mode, and so on, based on reception of input corresponding to the channel up/down button 116A or respective numeric buttons (buttons 1-6) on the remote control 114, thereby providing a simplified and faithful way to navigate between the content items for users (such as elderly persons).

In an embodiment, the circuitry 202 may be configured to receive a user input indicative of selection of one of the at least one menu option or the at least one input option. The circuitry 202 may be configured to output a notification indicative of invalidity of the selected one of the at least one menu option or the at least one input option. The notification may correspond to an alert on the display screen 414 in a case where the first user 112 selects the at least one menu option or the at least one input option which may be disabled for the determined user profile. Examples of the notification may include a text notification displayed on the display screen 414, or an audio notification via a speaker connected to the media rendering device 412. For example, as shown in Table 1, the language setting may be disabled for user profile 1. In a case where the media rendering device 412 receives a user input indicative of the selection of the language setting, the circuitry 202 may control the display screen 414 to display a notification on the display screen 414 indicating the invalidity of the selected language setting option. The notification displayed may be a text message (for example, "Language setting is invalid/disabled") displayed on the display screen 414. In another example, the circuitry 202 may control the display screen 414 to display a notification indicating that the end of list has been reached, in a case where the end of the list (for example, content F in the content list of the third UI element 422) has been reached and a navigation input is received to scroll off the list. For example, the notification may be a text message such as "the key press is not navigatable" or "the end of the list is reached".

In another example, the circuitry 202 may be configured to control the display screen 414 to display a notification indicating available control options on the media rendering device 412. This may further simplify navigation of the media rendering device 412 for the first user 112 (for example, an elderly person, or cognitively challenged person). For example, the simplified graphical user interface 416B may include a fourth UI element 424 and a fifth UI element 426. The fourth UI element 424 and the fifth UI element 426 may each correspond to a text notification box that may be configured to display the notification indicative of information corresponding to control options available for the first user 112 on the media rendering device 412. The fourth UI element 424 may display a message such as "Press OK on remote control to play." The fifth UI element 426 may display a message such as "Press channel up/down button on remote control during playback to watch content B." In another embodiment, the circuitry 202 may display the notification of available control options in response to reception of input for selecting one of the disabled menu options or the disable input options, and may hide the notification of available control options after a period of time.

Figure 5A:
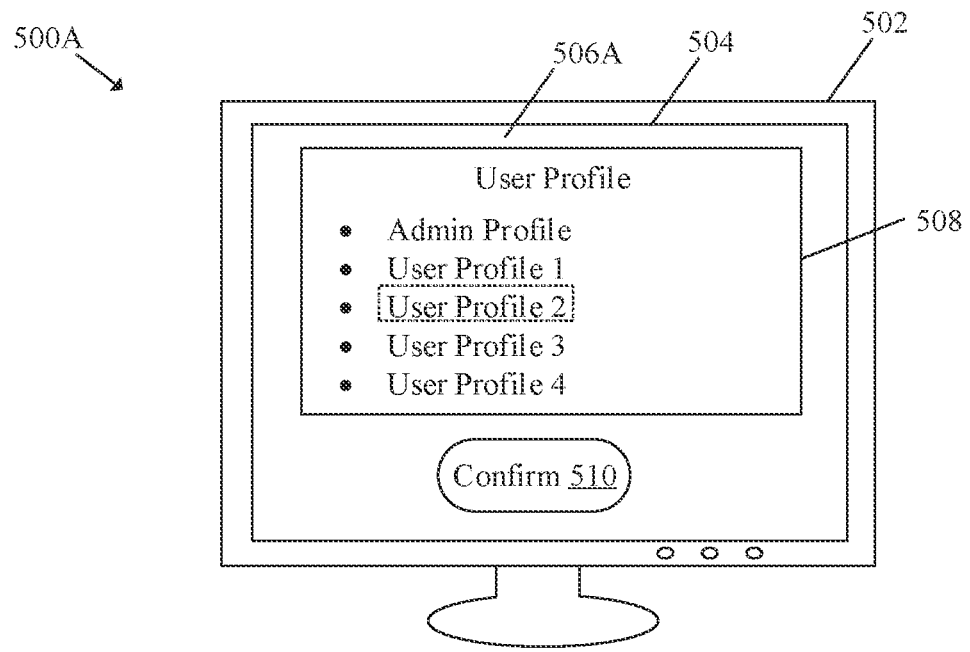
FIG. 5A is a diagram that illustrates an exemplary scenario for selection of a user profile on a media rendering device, in accordance with an embodiment of the disclosure.

FIG. 5A is a diagram that illustrates an exemplary scenario for selection of a user profile on a media rendering device, in accordance with an embodiment of the disclosure. FIG. 5A is described in conjunction with elements from FIGS. 1, 2, 3A, 3B, and 4. With reference to FIG. 5A, there is shown an exemplary scenario 500A. In the exemplary scenario 500A, there is shown a media rendering device 502, which may be an exemplary implementation of the media rendering device 102 of FIG. 1. The media rendering device 502 may include a display screen 504, which may be an exemplary implementation of the display device 108.

In the exemplary scenario 500A, the circuitry 202 may generate and display a graphical user interface 506A on the display screen 504 of the media rendering device 502. The graphical user interface 506A may be an exemplary implementation of the graphical user interface 306A. In the graphical user interface 506A, there is shown a first user interface (UI) element 508 and a second UI element 510. The first UI element 508 may correspond to a selection box configured to receive a user input indicative of a selection of the user profile from the plurality of user profiles. In an embodiment, the second UI element 510 may be a button that may be configured to receive a user confirmation of the selection made in the first UI element 508. The media rendering device 502 may determine the user profile of a second user of the media rendering device 502 based on the selection of "user profile 2" in the first UI element 508 and the user confirmation through the second UI element 510. Based on the confirmation, the media rendering device 502 may be configured to determine the user profile of the second user of the media rendering device 502, and may load the settings and preferences of the user profile of the second user from the memory 204.

In an embodiment, the second user profile may be associated with a second user interface mode of the plurality of user interface elements. The second user interface mode may be associated with a second subset of user interface elements. The second subset of the user interface elements may include fewer user interface elements than the first subset of user interface elements of the first user interface mode of FIG. 4. The second subset of user interface elements may include, but not limited to at least one first user interface element corresponding to playback of content from the first content access mode of the plurality of content access modes, and at least one second user interface element corresponding to playback of content from the second content access mode, of the plurality of content access modes, different from the first content access mode. An example of the second user interface mode is depicted in FIG. 5B.

Figure 5B:
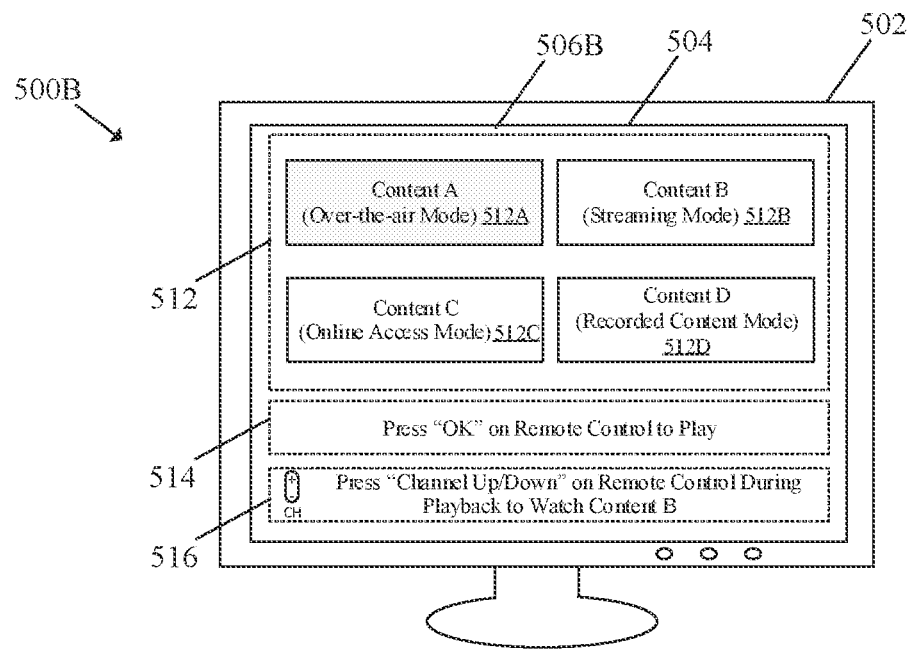
FIG. 5B is a diagram that illustrates an exemplary scenario for display of a simplified graphical user interface on a media rendering device in a second user interface mode, in accordance with an embodiment of the disclosure.

FIG. 5B is a diagram that illustrates an exemplary scenario for display of a simplified graphical user interface on a media rendering device in a second user interface mode, in accordance with an embodiment of the disclosure. FIG. 5B is described in conjunction with elements from FIGS. 1, 2, 3A, 3B, 4, and 5A. With reference to FIG. 5B, there is shown an exemplary scenario 500B. In the exemplary scenario 500B, there is shown the media rendering device 502. The media rendering device 502 may include the display screen 504 which may display the simplified graphical user interface 506B for the second user interface mode associated with the second user profile. The simplified graphical user interface 506B may include fewer user interface elements (for example, fewer icons) compared to the simplified graphical user interface 416B.

The simplified graphical user interface 506B may include a third UI element 512, a fourth UI element 514, and a fifth UI element 516. For example, the third UI element 512 may correspond to a selection box configured to receive a user input indicative of a selection of content from a content list. The third UI element 512 may include the second subset of icons including a first icon (such as icon 512A) corresponding to playback of content (such as "content A") from a first content access mode (such as over-the-air mode) of the plurality of content access modes, and a second icon (such as icon 512B) corresponding to playback of content (such as "content B") from a second content access mode (such as the streaming mode) of the plurality of content access modes.

The second subset of the user interface elements may further include a third icon (such as icon 512C) corresponding to playback of content (such as "content C") from a third content access mode (such as online access mode), and a fourth icon (such as icon 512D) corresponding to playback of content (such as "content D") from a fourth content access mode (such as recorded content mode) of the plurality of content access modes. In an embodiment, as shown in FIG. 5B, the simplified graphical user interface 506B may exclude the plurality of content groupings shown in FIG. 3B. The simplified graphical user interface 506B may have fewer menu options, fewer sub-menus, or fewer input options as compared to the specific user interface mode, described in FIG. 3B. For example, the simplified graphical user interface 506B may exclude one or more of the third UI element 312, the fourth UI element 314, the fifth UI element 316, the sixth UI element 318, the seventh UI element 320, the eighth UI element 322, the ninth UI element 324, and the eleventh UI element 328 of the standard graphical user interface 306B shown in FIG. 3B.

It may be noted the content access mode is shown along with the content item in FIG. 5B for illustration purposes only, and may not be displayed along with the content item in the simplified graphical user interface 506B. In an embodiment, the content to be showcased in the third UI element 512 for playback may be curated by the administrator user, as described, for example, in FIG. 8D. In another embodiment, the content to be showcased in the third UI element 512 for playback may be automatically selected based on the viewing history of the second user. It may be noted that the number of icons (for example, icons 512A-512D) corresponding to content items (such as content A to content D) shown in the simplified graphical user interface 506B of FIG. 5B is presented merely as an example. The present disclosure may also be applicable to the simplified graphical user interface 506B having fewer or more icons and corresponding content items based on the selected user profile, without departing from the scope of the disclosure.

In an example, the circuitry 202 may allow navigation between content items (such as content A to content D) based on reception of input corresponding to the channel up/down button 116A or numeric buttons on the remote control 114. In other words, the circuitry 202 may switch between content A corresponding to the over-the-air mode, content B corresponding to the streaming mode, content C corresponding to the online access mode, and content D corresponding to the recorded content mode, and so on, based on reception of input corresponding to the channel up/down button 116A or respective numeric buttons (buttons 1-4) on the remote control 114. The navigation between content items (such as content A to content D) using the channel up/down button 116A or the numeric buttons may simulate the navigation between content items on legacy cable television, thereby providing a simplified and faithful way to navigate between the content items for users (such as elderly persons).

In an embodiment, the fourth UI element 514 and the fifth UI element 516 may each correspond to a text notification box configured to display the notification indicative of information corresponding to control options available on the media rendering device 502. The fourth UI element 514 may display a message such as "Press OK on remote control to play." The fifth UI element 516 may display a message such as "Press channel up/down button on remote control to during playback to watch content B."

Figure 5C:
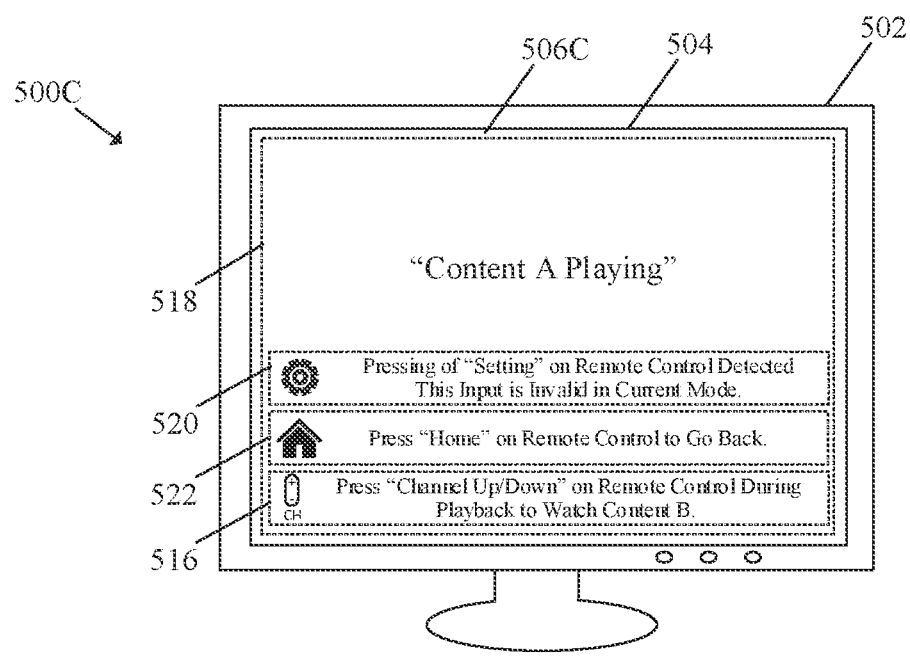
FIG. 5C is a diagram that illustrates an exemplary scenario for display of a simplified graphical user interface on a media rendering device in a second user interface mode, in accordance with an embodiment of the disclosure.

FIG. 5C is a diagram that illustrates an exemplary scenario for display of a simplified graphical user interface on a media rendering device in a second user interface mode. FIG. 5C is described in conjunction with elements from FIGS. 1, 2, 3A, 3B, 4, 5A, and 5B. With reference to FIG. 5C, there is shown an exemplary scenario 500C. In the exemplary scenario 500C, there is shown the media rendering device 502. The media rendering device 502 may include the display screen 504 which may display the graphical user interface 506C.

In the exemplary scenario 500C, the circuitry 202 may playback media content (for example, content A) on the display screen 504 based on the selection of content A in the simplified graphical user interface 506B. In an embodiment, the graphical user interface 506C may include a sixth UI element 518. The sixth UI element 518 may correspond to a playback area that may be configured to display content A based on the playback of content A.

In an embodiment, the circuitry 202 may be configured to control the display screen 504 to display a notification indicative of information corresponding to control options available on the media rendering device 502 during playback. This may simplify navigation of the media rendering device 502 for the second user (for example, an elderly person, or cognitively challenged person). For example, the graphical user interface 506C may include the fifth UI element 516, a seventh UI element 520, and an eighth UI element 522. The fifth UI element 516 may correspond to a text notification box configured to display a message such as "Press channel up/down button on remote control to during playback to watch content B." The seventh UI element 520 may correspond to a text notification box configured to display a message such as "Pressing of "Setting" on remote control detected. This input is invalid in current mode." The eighth UI element 522 may correspond to a text notification box configured to display a message such as "Press Home on remote control to go back." In an embodiment, the fifth UI element 516, the seventh UI element 520, and the eighth UI element 522 may be hidden during playback for unobstructed viewing, and the circuitry 202 may display these UI elements in response to reception of input from the remote control 114 for selecting one of the disabled menu options or the disable input options.

Figure 6:
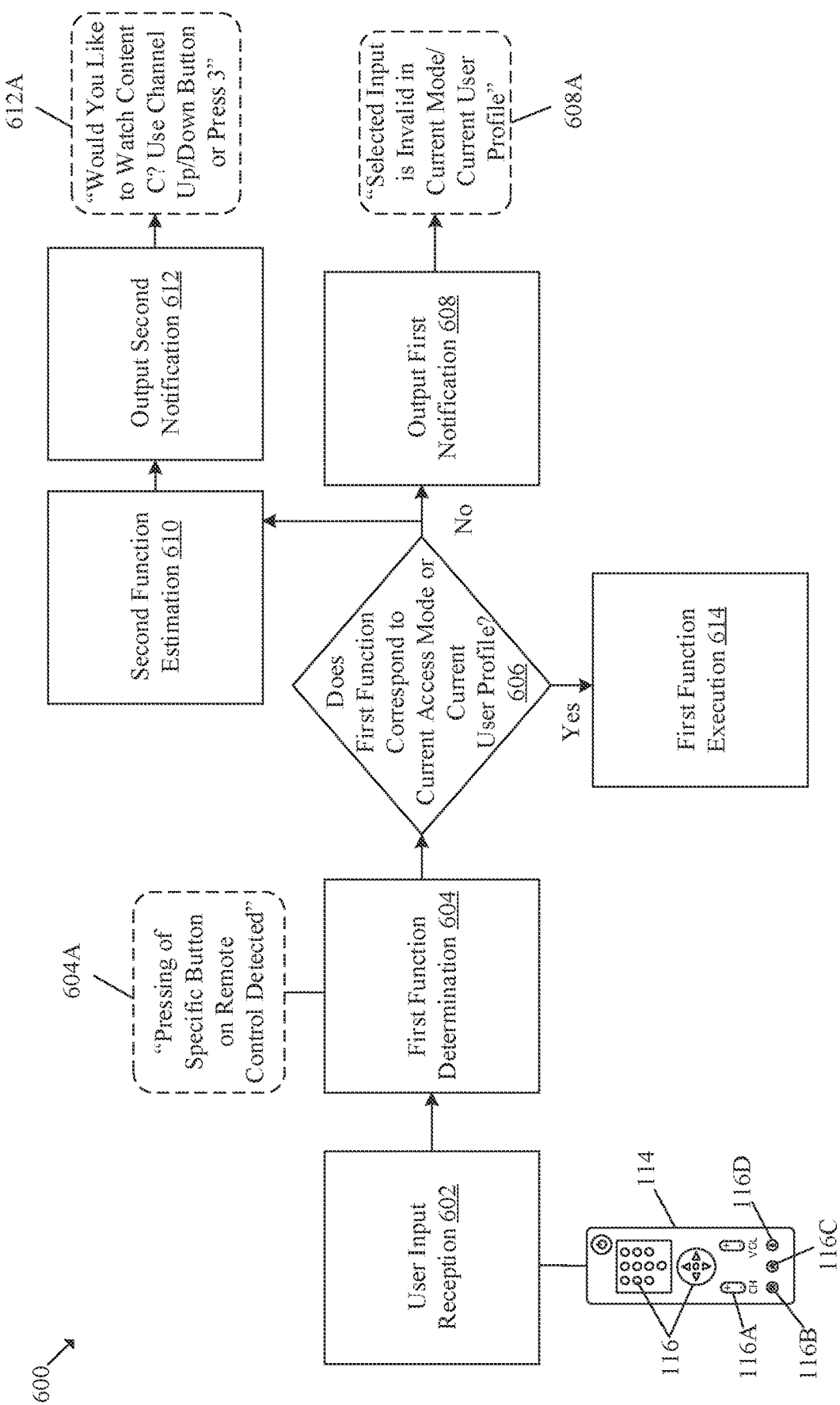
FIG. 6 is a diagram that illustrates exemplary operations for output of first notification on a media rendering device based on user input from a remote control, in accordance with an embodiment of the disclosure.

FIG. 6 is a diagram that illustrates exemplary operations for output of first notification on a media rendering device based on user input from a remote control, in accordance with an embodiment of the disclosure. FIG. 6 is described in conjunction with elements from FIGS. 1, 2, 3A, 3B, 4, and 5A-5C. With reference to FIG. 6, there is shown a block diagram 600 that illustrates exemplary operations from 602 to 614, as described herein. The exemplary operations illustrated in the block diagram 600 may start at 602 and may be performed by any computing system, apparatus, or device, such as by the media rendering device 102 of FIG. 1 or circuitry 202 of FIG. 2.

At 602, a user input may be received. In an embodiment, the circuitry 202 may be configured to receive, via the remote control 114, a user input indicative of a press of a first button of the plurality of buttons of the remote control 114. The first button may be associated with a first function. For example, the first button may be a "Settings" button 122 associated with the settings of the media rendering device 102. In another example, the first button may be a "Home" button 120 associated with the home screen of the media rendering device 102. In another example, the first button may be a "DVR" button associated with the recording function in a specific content access mode (for example, DVR mode) of the media rendering device 102.

At 604A, pressing of a specific button on the remote control 114 may be detected. At 604, a first function may be determined. In an embodiment, the circuitry 202 may be configured to determine the first function associated with the first button based on the detection of the pressing of the first button.

At 606, a determination may be made whether the first function corresponds to the current content access mode or the current user profile. In an embodiment, the circuitry 202 may be configured to determine whether the first function corresponds to the current content access mode of the media rendering device 102. For example, the circuitry 202 may determine that the first function (for example, DVR recording function) may not be relevant to the current content access mode (for example, streaming mode) of the media rendering device 102. In another example, the circuitry 202 may determine that the first function (for example, access to settings) may not be permitted based on the setting information of the current user profile. In a case where the first function may correspond to the current content access mode or may be permitted for the current user profile, the control may pass to 614. Otherwise, the control may pass to 608 and 610.

At 608, a first notification may output. In an embodiment, the circuitry 202 may be configured to output a first notification based on the determination that the first function corresponds to the specific content access mode different from the currently selected content access mode. The first notification indicates invalidity of the first function. For example, the circuitry 202 may control the display device 108 to display the notification that may include a message 608A such as "Selected input is invalid in current mode/current user profile".

At 610, a second function may be estimated. In an embodiment, the circuitry 202 may be configured to estimate the second function of the media rendering device 102 based on the reception of the user input indicative of the press of the first button. In an embodiment, the circuitry 202 may be configured to automatically estimate the second function of the media rendering device 102 based on learnt data from previous user inputs or viewing history of the user associated with current user profile. For example, the circuitry 202 may be configured to estimate that the user may wish to change the content to a news channel based on the received input (such as the pressing of the "settings" button 122) and the viewing history of the current user profile.

At 612, a second notification may be output. In an embodiment, the circuitry 202 may be configured to output the second notification that seeks user confirmation of execution of the estimated second function. The second notification may indicate the estimated second function, and seek user confirmation for the execution of the second function. For example, the circuitry 202 may control the display device 108 to display the second notification that may include a message 612A such as "Would you like to watch content C? Use channel up/down buttons or press 3". In an embodiment, the circuitry 202 may be configured to execute the second function (such as playback content C) based on the user confirmation.

At 614, the first function may be executed. In an embodiment, the circuitry 202 may be configured to execute the first function based on the determination that the first function corresponds to the current content access mode or is permitted for the current user profile. For example, the first function may be access to the Home screen on the media rendering device 102. The circuitry 202 may be configured to control the display device 108 to display the Home screen based on the execution of the first function.

Figure 7:
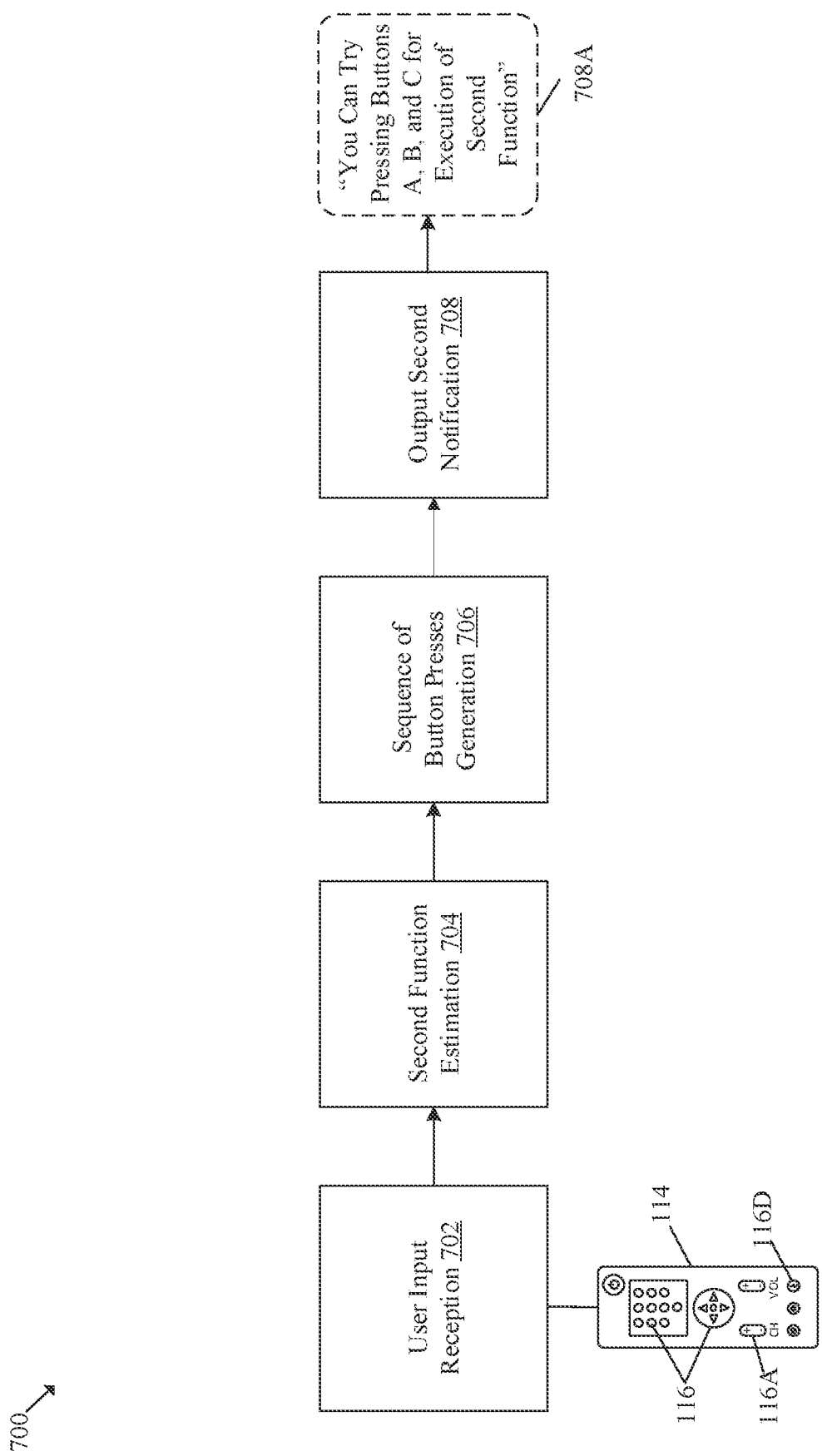
FIG. 7 is a diagram that illustrates exemplary operations for output of second notification on a media rendering device based on user input from a remote control, in accordance with an embodiment of the disclosure.

FIG. 7 is a diagram that illustrates exemplary operations for output of second notification on a media rendering device based on user input from a remote control, in accordance with an embodiment of the disclosure. With reference to FIG. 7, there is shown a block diagram 600 that illustrates exemplary operations from 702 to 708, as described herein. The exemplary operations illustrated in the block diagram 700 may start at 702 and may be performed by any computing system, apparatus, or device, such as by the media rendering device 102 of FIG. 1 or circuitry 202 of FIG. 2.

At 702, a user input may be received. In an embodiment, the circuitry 202 may be configured to receive, via the remote control 114, a user input indicative of a press of a first button of the plurality of buttons of the remote control. The first button may be associated with a second function. For example, the first button may be the voice button 116D on the remote control 114 associated with reception of voice input from the user to control the media rendering device 102. In an embodiment, the circuitry 202 may be configured to determine the first function corresponds to a specific content access mode of the plurality of content access modes different from a currently selected content access mode. In another embodiment, the circuitry 202 may be configured to determine the first function is disabled for the current user profile.

At 704, a second function may be estimated. In an embodiment, the circuitry 202 may be configured to estimate the second function of the media rendering device 102 based on the reception of the user input indicative of the press of the first button. In an embodiment, the circuitry 202 may be configured to automatically estimate the second function of the media rendering device 102 based on learnt data from the previous user inputs associated with the current selected mode and the current user profile. For example, the circuitry 202 may be configured to estimate based on the received input (such as the pressing of the voice button 116D) and the current user profile that the user may wish to change the audio settings.

At 706, a sequence of button presses may be generated. In an embodiment, the circuitry 202 may be configured to generate a sequence of button presses corresponding to the estimated second function. The sequence of button presses corresponds to navigation through the graphical user interface to access the estimated second function (for example, the audio settings). This may allow the media rendering device 102 to operate in a "handholding" mode to guide the user across one or more menu options and sub-menus of the graphical user interface to access the audio settings. For example, the sequence of button presses to change the audio settings from 2.1 channel to 5.1 channel may include "Home button→Settings button→down arrow (thrice)→*OK button→*up/down arrow (toggle)→*OK button."

At 708, a second notification may be output. In an embodiment, the circuitry 202 may be configured to output the second notification based on the generated sequence of button presses. In an embodiment, the second notification may indicate steps to guide the second user for the execution of the estimated second function. For example, the media rendering device 102 may display the second notification that may include a message 708A such as "You can try pressing buttons A, B, and C for execution of second function".

Figure 8A:
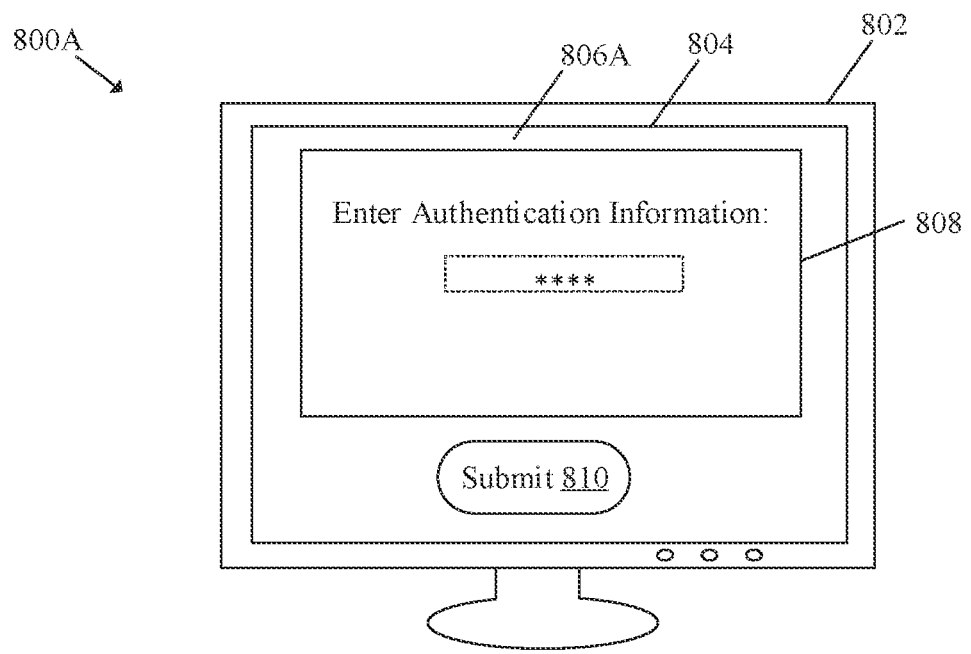
FIGS. 8A-8D are diagrams that illustrate exemplary scenarios for generation of a simplified graphical user interface on a media rendering device for one or more user profiles using an administrator profile, in accordance with an embodiment of the disclosure.

FIG. 8A is a diagram that illustrates an exemplary scenario for generation of a simplified graphical user interface on a media rendering device for one or more user profiles using an administrator profile. FIG. 8A is described in conjunction with elements from FIGS. 1, 2, 3A, 3B, 4, 5A-5C, 6, and 7. With reference to FIG. 8A, there is shown an exemplary scenario 800A. In the exemplary scenario 800A, there is shown a media rendering device 802 which may be an exemplary implementation of media rendering device 102. The media rendering device 802 may include a display screen 804, which may be an exemplary implementation of the display device 108.

In the exemplary scenario 800A, the circuitry 202 may be configured to control the display screen 804 to display a graphical user interface 806A to receive a user input indicative of authentication information associated with an administrator user. The authentication information may correspond to at least one of password or passcode that may be set by the administrator user during initial setup of the media rendering device 802. The authentication information may allow access to the Admin profile of the administrator user. The circuitry 202 may allow the administrator user to modify the setting information of the plurality of user profiles and curate content for the plurality of user profiles.

In the graphical user interface 806A, there is shown a first user interface (UI) element 808 and a second UI element 810. The first UI element 808 may correspond to a text box configured to receive a user input (such as the password or passcode) associated with the Admin profile. For example, the circuitry 202 may mask the entered authentication information on the display screen 804. The second UI element 810 may correspond to a button configured to receive a user confirmation to submit the authentication information entered through the first UI element 808. The circuitry 202 may authenticate the administrator user based on the received user input and the user confirmation on the graphical user interface 806A. Based on the authentication, the circuitry 202 may be configured to display the graphical user interface 806B, as described, for example, in FIG. 8B.

Figure 8B:
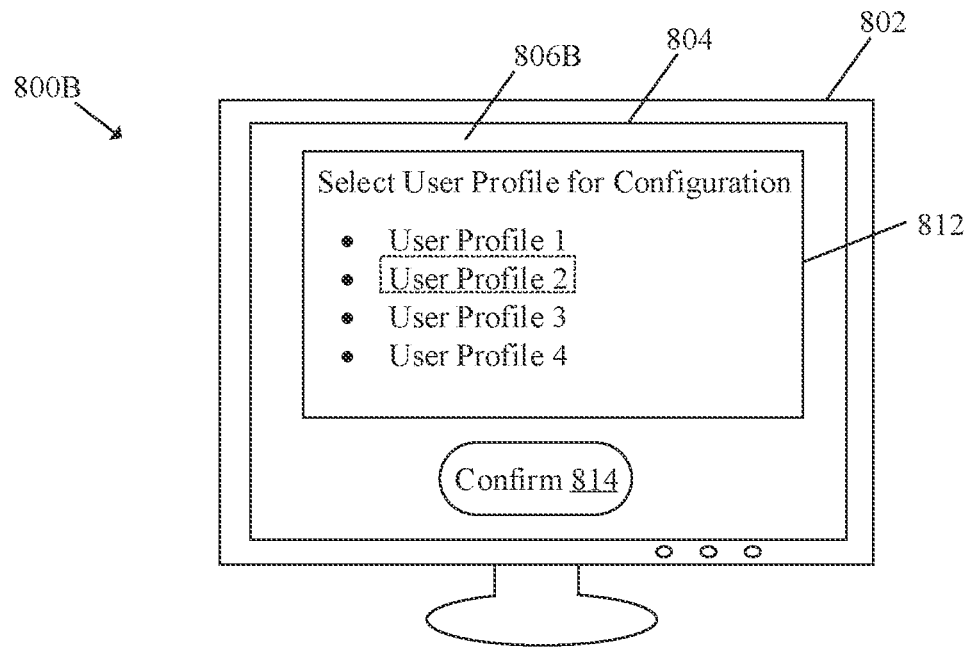

FIG. 8B is a diagram that illustrates an exemplary scenario for generation of a simplified graphical user interface on a media rendering device for one or more user profiles using an administrator profile, in accordance with an embodiment of the disclosure. FIG. 8B is described in conjunction with elements from FIGS. 1, 2, 3A, 3B, 4, 5A-5C, 6, 7, and 8A. With reference to FIG. 8B, there is shown an exemplary scenario 800B. In the exemplary scenario 800B, there is shown the media rendering device 802. The media rendering device 802 may include the display screen 804.

In the exemplary scenario 800B, the circuitry 202 may be configured to control the display screen 804 to display a graphical user interface 806B for selection of a user profile for configuring the simplified graphical user interface for the selected user profile. In the graphical user interface 806B, there is shown a third UI element 812 and a fourth UI element 814. The third UI element 812 may correspond to a selection box configured to receive a user input indicative of a selection of the user profile from a plurality of user profiles. For example, the plurality of user profiles may include, but not limited to, user profile 1 of the first user 112, user profile 2 of a second user, user profile 3 of a third user, and user profile 4 of a fourth user of the media rendering device 502. The selected user profile is highlighted on the display screen 804 by a dotted line. It may be noted that the plurality of user profiles is presented merely as an example. The exemplary scenario 800B may include fewer or more user profiles, without deviating from the scope of disclosure.

In an embodiment, the fourth UI element 814 may be a button that may be configured to receive a user confirmation of the selection made in the third UI element 812. The media rendering device 802 may select the user profile of the second user of the media rendering device 802 based on the received user input on the third UI element 812 and the user confirmation through the fourth UI element 814. Based on the selection of user profile 2, the circuitry 202 may be configured to generate a graphical user interface 806C, as described in FIG. 8C.

Figure 8C:
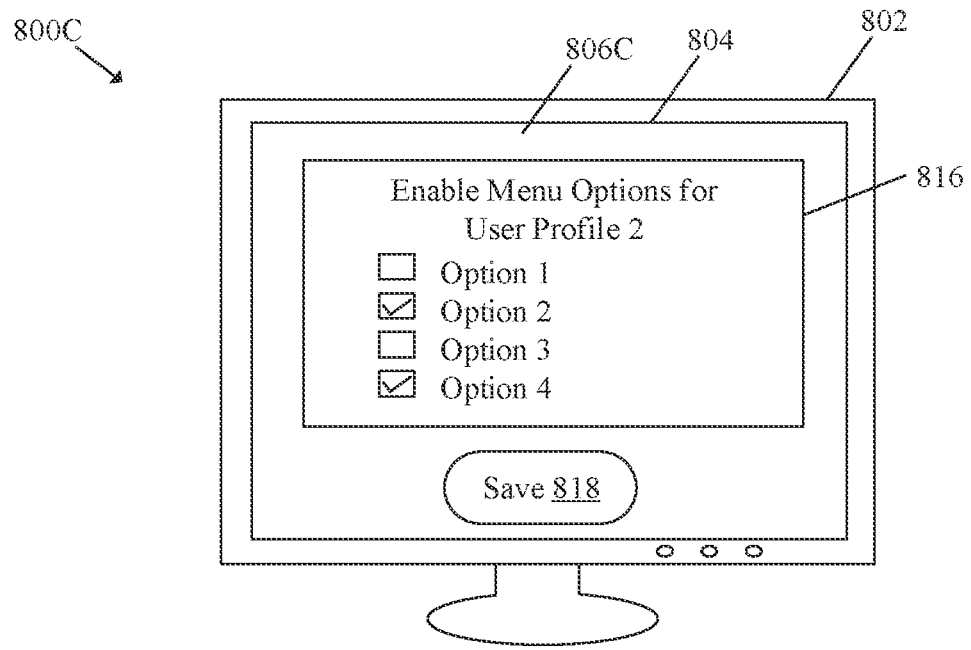

FIG. 8C is a diagram that illustrates an exemplary scenario for generation of a simplified graphical user interface on a media rendering device for one or more user profiles using an administrator profile, in accordance with an embodiment of the disclosure. FIG. 8C is described in conjunction with elements from FIGS. 1, 2, 3A, 3B, 4, 5A-5C, 6, 7, 8A, and 8B. With reference to FIG. 8C, there is shown an exemplary scenario 800C. In the exemplary scenario 800C, there is shown the media rendering device 802. The media rendering device 802 may include the display screen 804.

In the exemplary scenario 800C, the circuitry 202 may be configured to control the display screen 804 to display a graphical user interface 806C for configuring the simplified graphical user interface for the selected user profile. For example, the graphical user interface 806C may be generated to set menu options for the other user profiles of the media rendering device 102. In the graphical user interface 806C, there is shown a fifth UI element 816 and a sixth UI element 818.

The fifth UI element 816 may correspond to a widget having multiple checkboxes configured to receive, from the administrator user, user input indicative of enable/disable status of one or more menu options of the media rendering device 802 or one or more input options of the media rendering device 802 for the selected user profile (for example, user profile 2). For example, the check boxes corresponding to option 1 and option 3 may be unchecked, and the check boxes corresponding to option 2 and option 4 may be checked based on input from the administrator user. Based on the selection in the fifth UI element 816, the circuitry 202 may enable option 2 and option 4, and may disable option 1 and option 3 for the selected user profile 2. It may be noted that the menu options (options 1-4) are presented merely as an example. The exemplary scenario 800C may include fewer or more menu options, without deviating from the scope of disclosure. In an embodiment, the sixth UI element 818 may be a button configured to receive a user confirmation of the selections made in the fifth UI element 816. The circuitry 202 may update Table 1 stored in the memory 204 and described with reference to FIG. 3 based on the selection made in the fifth UI element 816.

Figure 8D:
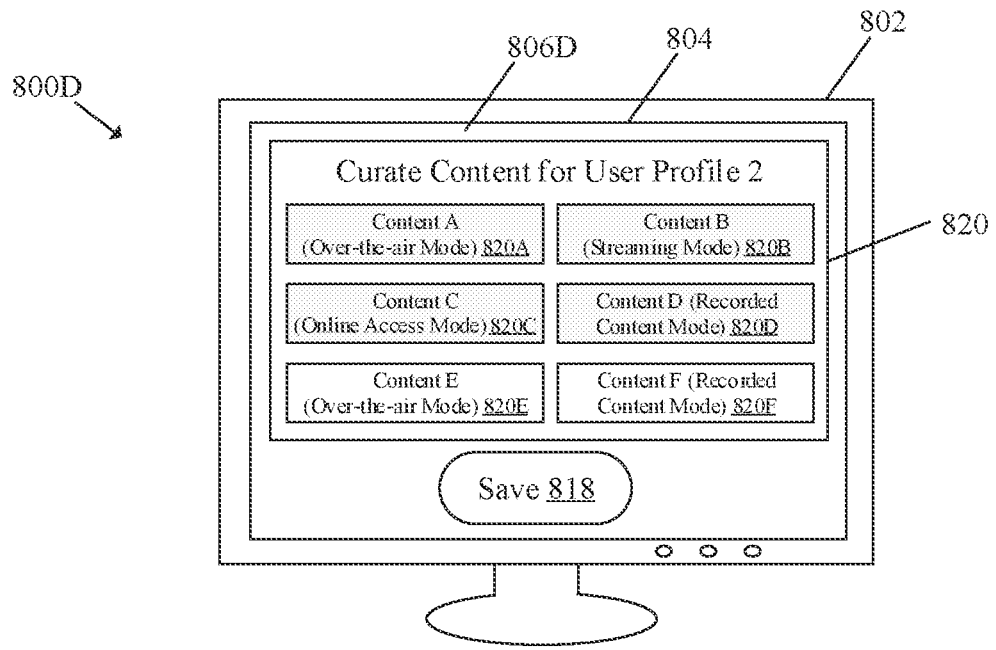

FIG. 8D is a diagram that illustrates an exemplary scenario for generation of a simplified graphical user interface on a media rendering device for one or more user profiles using an administrator profile, in accordance with an embodiment of the disclosure. FIG. 8D is described in conjunction with elements from FIGS. 1, 2, 3A, 3B, 4, 5A-5C, 6, 7, and 8A-8C. With reference to FIG. 8D, there is shown an exemplary scenario 800D. In the exemplary scenario 800D, there is shown the media rendering device 802. The media rendering device 802 may include the display screen 804.

In the exemplary scenario 800D, the circuitry 202 may be configured to control the display screen 804 to display a graphical user interface 806D for configuring the simplified graphical user interface for the selected user profile. For example, the graphical user interface 806D may be generated to curate content for the other user profiles of the media rendering device 102. In the graphical user interface 806D, there is shown the sixth UI element 818 and a seventh UI element 820.

The seventh UI element 820 may correspond to a selection box configured to receive, from the administrator user, a user input indicative of selection of content items from the plurality of content items corresponding to different access modes for the selected user profile (for example, user profile 2). For example, the seventh UI element 820 may include a first set of icons (such as icon 820A and icon 820E) corresponding to content items (such as content A and content E) from a first content access mode (such as over-the-air mode) of the plurality of content access modes, and a second set of icons (such as icon 820D and icon 820F) corresponding to content items (such as content D and content F) from a second content access mode (such as the recorded content mode). The seventh UI element 820 may further include a third set of icons (such as icon 820B) corresponding to content items (such as content B) from a third content access mode (such as the streaming mode), and fourth set of icons (such as icon 820C) corresponding to content items (such as content C) from a fourth content access mode (such as online access mode). It may be noted that the content items from the plurality of content access modes is presented merely as an example. The exemplary scenario 800D may include all the content items available for viewing in the standard interface mode of the media rendering device, without deviating from the scope of disclosure. The selected icons (such as icons 820A-820D) from the plurality of icons by the administrator user may be indicated by a different color or other highlighting feature.

In an embodiment, the sixth UI element 818 may be a button that may be configured to receive a user confirmation of the selections made in the seventh UI element 820 to curate the content for user profile 2. The circuitry 202 may store the configuration setting and content selections for user profile 2 in the memory 204 based on the received user input and the user confirmation through the graphical user interface 806C and the graphical user interface 806D. In an embodiment, the circuitry 202 may automatically curate content for user profile 2 based on the viewing history of the user associated with user profile 2. In an embodiment, the circuitry 202 may automatically disable one or more menu options and/or input options for user profile 2 based on the usage history of the user, age of the user, or other factors associated with user profile 2. For example, in a case where the user profile 2 is selected on the media rendering device 102 at a subsequent time, the circuitry 202 may generate the simplified user interface for user profile 2 based on the curated content items in the exemplary scenario 800D, and the hide one or more menu options and/or input options based on the disabled options in the exemplary scenario 800C.

Figure 9:
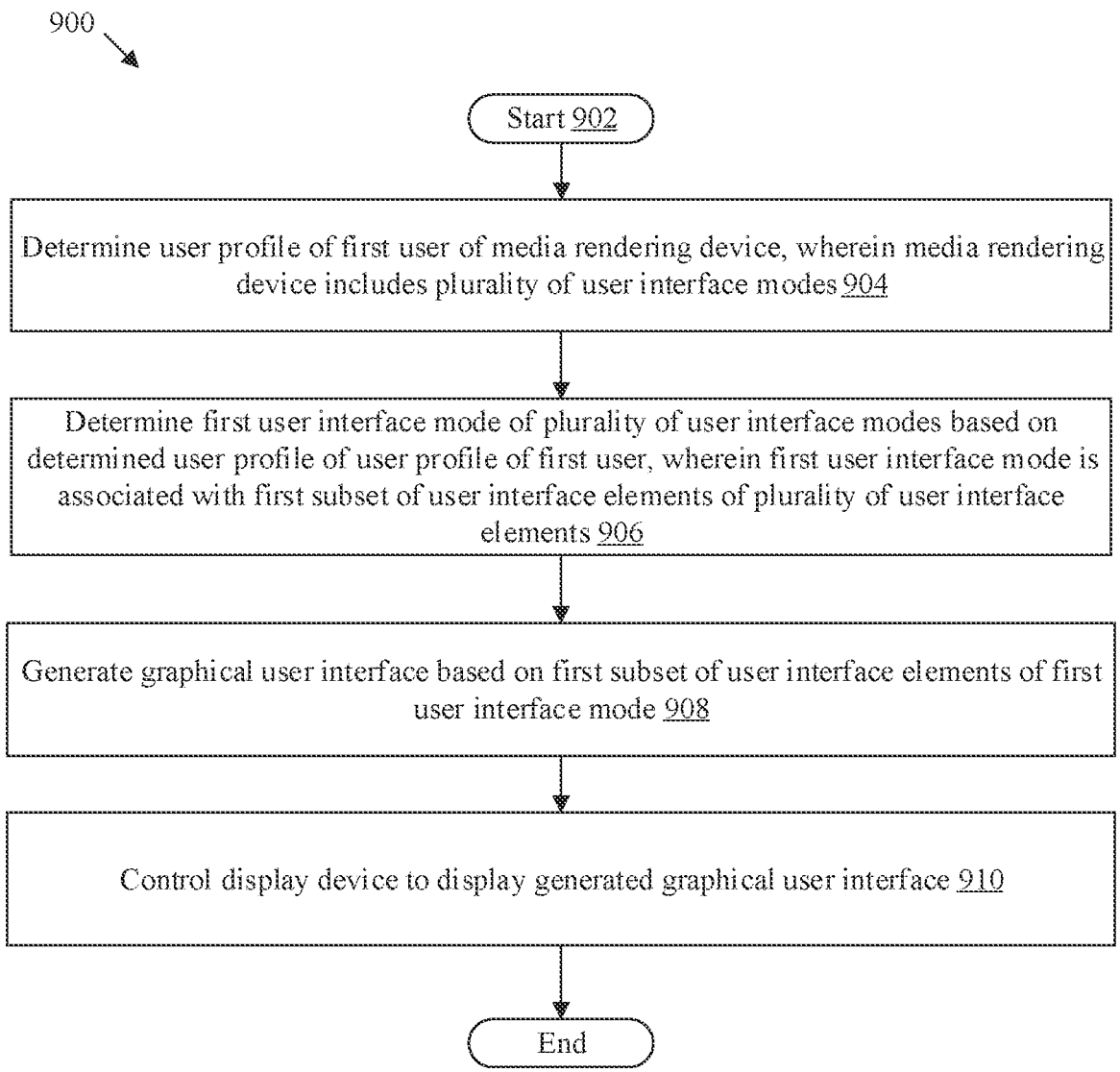
FIG. 9 is a flowchart that illustrates exemplary operations for generation of a simplified graphical user interface for a media rendering device, in accordance with an embodiment of the disclosure.

FIG. 9 is a flowchart that illustrates exemplary operations for generation of a simplified graphical user interface for a media rendering device, in accordance with an embodiment of the disclosure. FIG. 9 is described in conjunction with elements from FIGS. 1, 2, 3A, 3B, 4, 5A-5C, 6, 7, and 8A-8C. With reference to FIG. 9, there is shown a flowchart 900. The flowchart 900 may include operations from 902 to 910 and may be implemented on any computing device, for example, the media rendering device 102 or the circuitry 202. The flowchart 900 may start at 902 and may proceed to 904.

At 904, a user profile of the first user 112 of the media rendering device 102 may be determined, wherein the media rendering device 102 may include a plurality of user interface modes. In an embodiment, the circuitry 202 may be configured to determine the user profile of the first user 112 of the media rendering device 102. The plurality of user interface modes may include a specific user interface mode associated with a plurality of user interface elements. The determination of the user profile of the first user 112 is described, for example, in FIGS. 4 and 5A-5C.

At 906, a first user interface mode of the plurality of user interface modes may be determined based on the determined user profile of the first user 112, wherein the first user interface mode may be associated with a first subset of user interface elements of the plurality of user interface elements. In an embodiment, the circuitry 202 may be configured to determine the first user interface mode of the plurality of user interface modes based on the determined user profile of the first user 112. The first subset of user interface elements may include at least one first user interface element corresponding to playback of content from a first content access mode of a plurality of content access modes, and the first subset of user interface elements may include at least one second user interface element corresponding to playback of content from a second content access mode, of the plurality of content access modes, different from the first content access mode. The determination of the first user interface mode is described, for example, in FIGS. 4 and 5A-5C.

At 908, a graphical user interface (such as the simplified graphical user interface 416B) may be generated based on the first subset of user interface elements of the first user interface mode. In an embodiment, the circuitry 202 may be configured to generate the simplified graphical user interface 416B based on the first subset of user interface elements of the first user interface mode. The generation of the simplified graphical user interface 416B is described, for example, in FIGS. 4 and 5A-5C.

At 910, a display device (for example, the display device 108) may be controlled to display the generated simplified graphical user interface 416B. In an embodiment, the circuitry 202 may be configured to control the display device 108 to display the generated simplified graphical user interface 416B. The control of the display device 108 is described, for example, in FIGS. 4 and 5A-5C. Control may pass to end.

Although the flowchart 900 is illustrated as discrete operations, such as 904, 906, 908, and 910, the disclosure may be not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer to operate a media rendering device (for example, the media rendering device 102). The instructions may cause the media rendering device 102 to perform operations that include determination of a user profile of a first user 112 of the media rendering device. The media rendering device 102 may include a plurality of user interface modes. The plurality of user interface modes may include a specific user interface mode associated with a plurality of user interface elements. The operations may further include determination of a first user interface mode of the plurality of user interface modes based on the determined user profile of the first user 112. The first user interface mode may be associated with a first subset of user interface elements of the plurality of user interface elements. The first subset of user interface elements may include at least one first user interface element corresponding to playback of content from a first content access mode of a plurality of content access modes, and the first subset of user interface elements may include at least one second user interface element corresponding to playback of content from a second content access mode, of the plurality of content access modes, different from the first content access mode. The operations may further include generation of a graphical user interface (for example, the simplified graphical user interface 416B) based on the first subset of user interface elements of the first user interface mode. The operations may further include control of a display device (for example, the display device 108) to display the generated simplified graphical user interface 416B.

Exemplary aspects of the disclosure may provide a media rendering device (such as, the media rendering device 102 of FIG. 1) that includes circuitry (such as, the circuitry 202). The circuitry 202 may be configured to determine a user profile of a first user 112 of the media rendering device 102. The media rendering device 102 may include a plurality of user interface modes. The plurality of user interface modes may include a specific user interface mode associated with a plurality of user interface elements. The circuitry 202 may be further configured to determine a first user interface mode of the plurality of user interface modes based on the determined user profile of the first user 112. The first user interface mode may be associated with a first subset of user interface elements of the plurality of user interface elements. The first subset of user interface elements may include at least one first user interface element corresponding to playback of content from a first content access mode of a plurality of content access modes, and the first subset of user interface elements may include at least one second user interface element corresponding to playback of content from a second content access mode, of the plurality of content access modes, different from the first content access mode. The circuitry 202 may be further configured to generate a simplified graphical user interface 416B based on the first subset of user interface elements of the first user interface mode. The circuitry 202 may be further configured to control a display device 108 to display the generated simplified graphical user interface 416B.

In accordance with an embodiment, the circuitry 202 may be configured to determine setting information associated with the determined user profile of the first user 112. The circuitry 202 may be further configured to disable one of at least one menu option of the media rendering device 102 or at least one input option of the media rendering device 102, based on the determined setting information.

In accordance with an embodiment, the circuitry 202 may be configured to receive a user input indicative of selection of one of the at least one menu option or the at least one input option. The circuitry 202 may be further configured to output a notification indicative of invalidity of the selected one of the at least one menu option or the at least one input option.

In accordance with an embodiment, the plurality of user interface elements may include a plurality of icons related to the content from the plurality of content access modes, one or more configuration settings of the media rendering device 102, and the plurality of content access modes of the media rendering device 102. In an embodiment, the plurality of content access modes may include over-the-air mode, streaming mode, recorded content mode, and online access mode.

In accordance with an embodiment, the circuitry 202 may be configured to determine a user profile of a second user of the media rendering device 102. The circuitry 202 may be further configured to determine a second user interface mode of the plurality of user interface modes based on the determined user profile of the second user. The second user interface mode may be associated with a second subset of user interface elements of the plurality of user interface elements, and the second subset of user interface elements may include fewer user interface elements than the first subset of user interface elements.

In accordance with an embodiment, a remote control 114 may be communicatively coupled with the media rendering device 102. The remote control 114 may include a plurality of buttons 116. The circuitry 202 may be configured to receive, via the remote control 114, a user input indicative of a press of a first button of the plurality of buttons 116 of the remote control 114. The first button may be associated with a first function. The circuitry 202 may be further configured to determine the first function corresponds to a specific content access mode of the plurality of content access modes different from a currently selected content access mode. The circuitry 202 may be further configured to output a first notification based on the determination that the first function corresponds to the specific content access mode different from the currently selected content access mode. The first notification may indicate invalidity of the first function.

In an embodiment, the circuitry 202 may be configured to estimate a second function of the media rendering device based on the reception of the user input indicative of the press of the first button. The circuitry 202 may be further configured to generate a sequence of button presses. The sequence of button presses may correspond to navigation through the graphical user interface to access the estimated second function. The circuitry 202 may be further configured to output a second notification based on the generated sequence of button presses.

In an embodiment, the circuitry 202 may be configured to estimate a second function of the media rendering device based on the reception of the user input indicative of the press of the first button. The circuitry 202 may be further configured to output a second notification that seeks user confirmation for execution of the estimated second function. The circuitry 202 may be further configured to execute the estimated second function based on the user confirmation.

In an embodiment, a remote control 114 may be communicatively coupled with the media rendering device 102. The remote control may include a set of navigation buttons. The circuitry 202 may be further configured to navigate between a plurality of content items, each corresponding to a different content access mode of the plurality of content access modes, based on user input indicative of consecutive selection of the set of navigation buttons.

In an embodiment, the circuitry 202 may be configured to hide one or more sub-menus from the generated graphical user interface. The one or more sub-menus may be associated with one of the plurality of content access modes or configuration settings of the media rendering device. The circuitry 202 may be further configured to control the display device to display the generated graphical user interface based on the hidden one or more sub-menus.

In an embodiment, the user profile of the first user may be associated with at least one of: age of the first user, content preferences of the first user, preferences related to configuration settings of the media rendering device, or a viewing history of the first user.

In an embodiment, the circuitry 202 may be configured to receive a user input indicative of a selection of the user profile from a plurality of user profiles. Based on the received user input, the circuitry 202 may be further configured to determine the user profile of the first user of the media rendering device 102.

In an embodiment, the circuitry 202 may be further configured to acquire one of a voice or an image of the first user. Based on the acquired one of the voice or the image of the first user, the circuitry 202 may be further configured to determine the user profile of the first user of the media rendering device 102.

In an embodiment, the circuitry 202 may be further configured to receive a first user input indicative of authentication information associated with a second user. The circuitry 202 may be further configured to update the graphical user interface to display the plurality of user interface elements, and receive a second user input to modify the first subset of user interface elements of the first user interface mode associated the first user.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A media rendering device, comprising:
    circuitry configured to:
        determine a user profile of a first user of the media rendering device, wherein
            the media rendering device comprises a plurality of user interface modes,
            the plurality of user interface modes comprises a specific user interface mode associated with a plurality of user interface elements and at least one menu option, and the at least one menu option comprises a plurality of sub-menus;
        determine a first user interface mode of the plurality of user interface modes based on the determined user profile of the first user, wherein
            the first user interface mode is associated with a first subset of user interface elements of the plurality of user interface elements,
            the first subset of user interface elements comprises at least one first user interface element corresponding to playback of content from a first content access mode of a plurality of content access modes, and
            the first subset of user interface elements comprises at least one second user interface element corresponding to playback of content from a second content access mode, of the plurality of content access modes, different from the first content access mode;
        generate a graphical user interface based on the first subset of user interface elements of the first user interface mode;
        hide one or more sub-menus of the plurality of sub-menus from the generated graphical user interface for the determined user profile, such that the first user interface mode has fewer sub-menus compared to the specific user interface mode; and
        control a display device to display the generated graphical user interface based on the hidden one or more sub-menus.

2. The media rendering device according to claim 1, wherein the circuitry is further configured to:
    determine setting information associated with the determined user profile of the first user; and
    disable one of the at least one menu option of the media rendering device or at least one input option of the media rendering device, based on the determined setting information.

3. The media rendering device according to claim 2, wherein the circuitry is further configured to:
    receive a user input indicative of selection of one of the at least one menu option or the at least one input option; and
    output a notification indicative of invalidity of the selected one of the at least one menu option or the at least one input option.

4. The media rendering device according to claim 1, wherein the plurality of user interface elements comprises a plurality of icons related to the content from the plurality of content access modes, one or more configuration settings of the media rendering device, and the plurality of content access modes of the media rendering device.

5. The media rendering device according to claim 1, wherein the plurality of content access modes comprises over-the-air mode, streaming mode, recorded content mode, and online access mode.

6. The media rendering device according to claim 1, wherein the circuitry further configured to:
    determine a user profile of a second user of the media rendering device; and
    determine a second user interface mode of the plurality of user interface modes based on the determined user profile of the second user, wherein the second user interface mode is associated with a second subset of user interface elements of the plurality of user interface elements, and the second subset of user interface elements includes fewer user interface elements than the first subset of user interface elements.

7. The media rendering device according to claim 1, further comprising a remote control communicatively coupled with the media rendering device, wherein the remote control comprises a plurality of buttons, and the circuitry is further configured to:

receive, via the remote control, a user input indicative of a press of a first button of the plurality of buttons of the remote control, wherein the first button is associated with a first function;

determine the first function corresponds to a specific content access mode of the plurality of content access modes different from a currently selected content access mode; and output a first notification based on the determination that the first function corresponds to the specific content access mode different from the currently selected content access mode, wherein the first notification indicates invalidity of the first function.

8. The media rendering device according to claim 7, wherein the circuitry is further configured to:

estimate a second function of the media rendering device based on the reception of the user input indicative of the press of the first button;

generate a sequence of button presses, wherein the sequence of button presses corresponds to navigation through the graphical user interface to access the estimated second function; and output a second notification based on the generated sequence of button presses.

9. The media rendering device according to claim 7, wherein the circuitry is further configured to:

estimate a second function of the media rendering device based on the reception of the user input indicative of the press of the first button;

output a second notification that seeks user confirmation of execution of the estimated second function; and execute the estimated second function based on the user confirmation.

10. The media rendering device according to claim 1, further comprising a remote control communicatively coupled with the media rendering device, wherein the remote control comprises a set of navigation buttons, and the circuitry is further configured to switch between a first content item and a second content item, each corresponding to a different content access mode of the plurality of content access modes, based on user input indicative of selection of the set of navigation buttons.

11. The media rendering device according to claim 1, wherein the hidden one or more sub-menus are associated with one of the plurality of content access modes or configuration settings of the media rendering device.

12. The media rendering device according to claim 1, wherein the user profile of the first user is associated with at least one of: age of the first user, content preferences of the first user, preferences related to configuration settings of the media rendering device, or a viewing history of the first user.

13. The media rendering device according to claim 1, wherein the circuitry is configured to:

receive a user input indicative of a selection of the user profile from a plurality of user profiles; and determine the user profile of the first user of the media rendering device based on the received user input.

14. The media rendering device according to claim 1, wherein the circuitry is configured to:

acquire one of a voice or an image of the first user; and determine the user profile of the first user of the media rendering device based on the acquired one of the voice or the image of the first user.

15. The media rendering device according to claim 1, wherein the circuitry is further configured to:

receive a first user input indicative of authentication information associated with a second user;

update the graphical user interface to display the plurality of user interface elements; and receive a second user input to modify the first subset of user interface elements of the first user interface mode associated the first user.

16. A method, comprising:

in a media rendering device:

determining a user profile of a first user of the media rendering device, wherein the media rendering device comprises a plurality of user interface modes, the plurality of user interface modes comprises a specific user interface mode associated with a plurality of user interface elements and at least one menu option, and the at least one menu option comprises a plurality of sub-menus;

determining a first user interface mode of the plurality of user interface modes based on the determined user profile of the first user, wherein the first user interface mode is associated with a first subset of user interface elements of the plurality of user interface elements, the first subset of user interface elements comprises at least one first user interface element corresponding to playback of content from a first content access mode of a plurality of content access modes, and the first subset of user interface elements comprises at least one second user interface element corresponding to playback of content from a second content access mode, of the plurality of content access modes, different from the first content access mode;

generating a graphical user interface based on the first subset of user interface elements of the first user interface mode;

hiding one or more sub-menus of the plurality of sub-menus from the generated graphical user interface for the determined user profile, such that the first user interface mode has fewer sub-menus compared to the specific user interface mode; and controlling a display device to display the generated graphical user interface based on the hidden one or more sub-menus.

17. The method according to claim 16, further comprising:

determining setting information associated with the determined user profile of the first user; and disabling one of the at least one menu option of the media rendering device or at least one input option of the media rendering device, based on the determined setting information.

18. The method according to claim 17, further comprising:
- receiving a user input indicative of selection of one of the at least one menu option or the at least one input option; and
- outputting a notification indicative of invalidity of the selected one of the at least one menu option or the at least one input option.

19. The method according to claim 16, further comprising:
- determining a user profile of a second user of the media rendering device; and
- determining a second user interface mode of the plurality of user interface modes based on the determined user profile of the second user, wherein
  - the second user interface mode is associated with a second subset of user interface elements of the plurality of user interface elements, and
  - the second subset of user interface elements includes fewer user interface elements than the first subset of user interface elements.

20. A non-transitory computer-readable medium having stored thereon, computer-executable instructions which, when executed by a processor of a media rendering device, cause the processor to execute operations, the operations comprising:
- determining a user profile of a first user of the media rendering device, wherein
  - the media rendering device comprises a plurality of user interface modes,
  - the plurality of user interface modes comprises a specific user interface mode associated with a plurality of user interface elements and at least one menu option, and
  - the at least one menu option comprises a plurality of sub-menus;
- determining a first user interface mode of the plurality of user interface modes based on the determined user profile of the first user, wherein
  - the first user interface mode is associated with a first subset of user interface elements of the plurality of user interface elements,
  - the first subset of user interface elements comprises at least one first user interface element corresponding to playback of content from a first content access mode of a plurality of content access modes, and
  - the first subset of user interface elements comprises at least one second user interface element corresponding to playback of content from a second content access mode, of the plurality of content access modes, different from the first content access mode;
- generating a graphical user interface based on the first subset of user interface elements of the first user interface mode;
- hiding one or more sub-menus of the plurality of sub-menus from the generated graphical user interface for the determined user profile, such that the first user interface mode has fewer sub-menus compared to the specific user interface mode; and
- controlling a display device to display the generated graphical user interface based on the hidden one or more sub-menus.

\* \* \* \* \*